(12) United States Patent
Song et al.

(10) Patent No.: US 11,997,731 B2
(45) Date of Patent: *May 28, 2024

(54) ELECTRONIC DEVICE, REMOTE CONTROL DEVICE AND CONTROLLING METHOD THEREOF

(71) Applicant: SAMSUNG ELECTRONICS CO., LTD., Suwon-si (KR)

(72) Inventors: Kihyun Song, Suwon-si (KR); Jehwan Seo, Suwon-si (KR); Minsup Kim, Suwon-si (KR); Sukhoon Yoon, Suwon-si (KR); Jongkeun Lee, Suwon-si (KR); Chaeyoung Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/992,798

(22) Filed: Nov. 22, 2022

(65) Prior Publication Data

US 2023/0082147 A1 Mar. 16, 2023

Related U.S. Application Data

(63) Continuation of application No. 17/255,078, filed as application No. PCT/KR2019/001628 on Feb. 11, 2019, now Pat. No. 11,533,766.

(30) Foreign Application Priority Data

Jun. 28, 2018 (KR) .......................... 10-2018-0074680

(51) Int. Cl.
*H04W 4/00* (2018.01)
*H04Q 9/04* (2006.01)
(Continued)

(52) U.S. Cl.
CPC .............. *H04W 76/14* (2018.02); *H04Q 9/04* (2013.01); *H04W 4/80* (2018.02); *H04W 8/005* (2013.01); *H04W 48/16* (2013.01)

(58) Field of Classification Search
CPC ..... H04W 776/14; H04W 4/80; H04W 8/005; H04W 48/16; H04W 4/00; H04Q 9/04
(Continued)

(56) References Cited

U.S. PATENT DOCUMENTS 7,155,305 B2 12/2006 Hayes
8,588,806 B2 11/2013 Howard
(Continued)

FOREIGN PATENT DOCUMENTS

KR 10-2013-0057373 5/2013
KR 10-2014-0082223 7/2014
(Continued)

OTHER PUBLICATIONS

International Search Report for PCT/KR2019/001628, with English translation, dated May. 22, 2019, 4 pages.
(Continued)

*Primary Examiner* — Marceau Milord
(74) *Attorney, Agent, or Firm* — Nixon & Vanderhye, P.C.

(57) ABSTRACT

An example electronic device includes a first communication unit, a second communication unit, and a processor for performing control such that the second communication unit operates in a scan state in which an undirected advertising packet can be received when a preset IR signal is received from a remote control device through the first communication unit, acquiring identification information of a target device from the undirected advertising packet when the undirected advertising packet is received from the remote control device in the scan state, and providing a user
(Continued)

interface (UI) for guiding a Bluetooth connection with remote control device when the acquired identification information of a target device matches identification information of the electronic device.

20 Claims, 18 Drawing Sheets

(51) Int. Cl.
*H04W 4/80* (2018.01)
*H04W 8/00* (2009.01)
*H04W 48/16* (2009.01)
*H04W 76/14* (2018.01)

(58) Field of Classification Search
USPC .......................................................... 370/329
See application file for complete search history.

(56) References Cited

U.S. PATENT DOCUMENTS

| | | | |
|---|---|---|---|
| 8,704,958 B2 | 4/2014 | Lim et al. | |
| 8,896,530 B2 | 11/2014 | Kim et al. | |
| 9,106,337 B2 | 8/2015 | Jung et al. | |
| 9,295,024 B2 | 3/2016 | Howard | |
| 9,357,574 B2 | 5/2016 | Lee et al. | |
| 9,715,287 B2 | 7/2017 | Park et al. | |
| 9,763,275 B2 | 9/2017 | Park et al. | |
| 9,942,700 B2 | 4/2018 | Howard | |
| 10,063,804 B2 | 8/2018 | Yang et al. | |
| 10,111,272 B1* | 10/2018 | Withers | H04W 76/14 |
| 11,533,766 B2* | 12/2022 | Song | G08C 17/02 |
| 11,625,506 B1* | 4/2023 | Smith | H05K 5/0247 |
| | | | 726/34 |
| 2007/0032250 A1 | 2/2007 | Feher | |
| 2013/0129358 A1 | 5/2013 | Jung | |
| 2014/0154983 A1 | 6/2014 | Schultz | |
| 2014/0378056 A1 | 12/2014 | Liu | |
| 2015/0271432 A1* | 9/2015 | Muth | H04W 12/50 |
| | | | 348/552 |
| 2016/0205148 A1 | 7/2016 | Lee et al. | |
| 2017/0180918 A1 | 6/2017 | Yang et al. | |
| 2017/0245124 A1* | 8/2017 | Child | H04W 4/021 |
| 2017/0347264 A1* | 11/2017 | Holland | H04L 9/3242 |
| 2018/0316658 A1* | 11/2018 | Bartlett | H04W 12/041 |
| 2018/0317266 A1* | 11/2018 | Britt | H04W 4/80 |
| 2018/0338107 A1 | 11/2018 | Yang | |
| 2019/0361694 A1* | 11/2019 | Gordon | G06F 1/3231 |
| 2019/0373430 A1* | 12/2019 | Srivatsa | H04W 76/11 |

FOREIGN PATENT DOCUMENTS

| | | |
|---|---|---|
| KR | 10-2015-0017186 | 2/2015 |
| KR | 10-2015-0028501 | 3/2015 |
| KR | 10-2017-0033172 | 3/2017 |
| KR | 10-2017-0073257 | 6/2017 |
| WO | 2017/110297 | 6/2017 |

OTHER PUBLICATIONS

Written Opinion of the ISA for PCT/KR2019/001628, with English translation, dated May 22, 2019, 7 pages.
Notice of Allowance dated Mar. 17, 2022 in KR Application No. 10-2018-0074680 and English-language translation.
Song et al. U.S. Appl. No. 17/255,078, filed Dec. 22, 2020.

* cited by examiner

<Undirected Advertising Packet (Pairing Guide Request)>

<Paring UI-2>

ELECTRONIC DEVICE, REMOTE CONTROL DEVICE AND CONTROLLING METHOD THEREOF

CROSS-REFERENCE TO RELATED APPLICATIONS

This application is a continuation of U.S. application Ser. No. 17/255,078, filed Dec. 22, 2020, now U.S. Pat. No. 11,533,766, which is the U.S. national phase of International Application No. PCT/KR2019/001628 filed 11 Feb. 2019, which designated the U.S. and claims priority to KR Patent Application No. 10-2018-0074680 filed 28 Jun. 2018. The entire contents of each of these applications is hereby incorporated by reference.

BACKGROUND

Field

This disclosure relates to an electronic device, a remote control device, and a method for controlling thereof and, more particularly, to an electronic device connected by Bluetooth communication and a method for controlling thereof.

Description of Related Art

Development of electronic technology has led to development and distribution of various kinds of electronic devices. In particular, various types of electronic devices, including a television (TV), have recently been used in general homes. These electronic devices have a wide variety of functions depending on user's needs.

For example, a function is provided such that a display device, such as a TV, and a remote control device are connected via Bluetooth communication so that data can be transmitted and received between each other.

In general, Bluetooth pairing between devices needs to be performed for a Bluetooth connection, pairing may be performed only once at first time, and a Bluetooth connection between devices may be performed based on pairing information.

However, even though the pairing information is not lost, the Bluetooth connection may not be properly performed, in which case there may be a problem that the user cannot recognize the corresponding problem.

SUMMARY

The disclosure has been made in view of the above-described needs, and it is an object of the disclosure to provide an electronic device for guiding a problem solving operation when Bluetooth connection is not properly performed, a remote control device, and a method for controlling thereof.

An electronic device according to an embodiment includes a first communication unit, a second communication unit, a processor configured to based on a preset infra-red (IR) signal is received from a remote control device through the first communication unit, control the second communication unit to operate in a scan state in which an undirected advertising packet is receivable, based on the undirected advertising packet being received from the remote control device in the scan state, acquire identification information of a target device from the undirected advertising packet, and based on the acquired identification information of a target device matching identification information of the electronic device, provide a user interface (UI) for guiding a Bluetooth connection with the remote control device.

The processor may, based on the acquired identification information of a target device matching the identification information of the electronic device, identify whether identification information of the remote control device included in the undirected advertising packet matches identification included in Bluetooth pairing history, and provide the UI based on the identification.

The processor may, based on identification information of the remote control device matching identification information included in the Bluetooth pairing history, provide a UI for guiding a user's manipulation to perform reconnection with the remote control device.

The processor may, based on identification information of the remote control device not matching the identification included in the Bluetooth pairing history, provide a UI for guiding a user's manipulation to perform pairing with the remote control device.

Identification information of the target device may be stored in a field assigned to record custom data in the undirected advertising packet.

The preset IR signal may be a signal to control the second communication unit to operate in the scan state.

The processor may, based on first information included in the received IR signal matching preset first information, identify whether preset second information is included in the IR signal, and based on the second information being included in the IR signal, control the second communication unit to operate in a scan state capable of receiving the undirected advertising packet.

The preset first information may be manufacturer information, and the preset second information may be information to control the second communication to operate in a scan state.

The UI for guiding the Bluetooth connection may include at least one of a UI for guiding Bluetooth pairing, or a UI for guiding Bluetooth connection.

A remote control device according to an embodiment includes a first communication unit, a second communication unit, and a processor configured to, based on receiving a user input, identify whether the first communication unit is Bluetooth-paired, based on Bluetooth pairing with the external device being identified, identify whether the first communication unit is Bluetooth-connected, based on identification that the first communication unit is not Bluetooth-connected, transmit a directed advertising packet including identification information of an external device during a preset time, based on connection with the external device being unable during the preset time, control the second communication unit to transmit, to the external device, a preset IR signal to cause the target device to operate in a scan state capable of receiving an undirected advertising packet, and broadcast undirected advertising packet including identification information of the external device through the first communication unit.

Identification information of the external device may be stored in a field assigned to record custom data in the undirected advertising packet.

A method for controlling an electronic device according to an embodiment includes, based on receiving a preset infra-red (IR) signal from a remote control device, controlling the electronic device to operate in a scan state capable of receiving an undirected advertising packet, based on the undirected advertising packet being received from the remote control device in the scan state, acquiring identification information of a target device from the undirected advertising packet; and based on the acquired identification information of a target device matching identification information of the electronic device, providing a user interface (UI) for guiding a Bluetooth connection with the remote control device.

The providing the UI may include, based on the acquired identification information of a target device matching the identification information of the electronic device, identifying whether identification information of the remote control device included in the undirected advertising packet matches identification included in Bluetooth pairing history, and providing the UI based on the identification.

The providing the UI may include, based on identification information of the remote control device matching identification information included in the Bluetooth pairing history, providing a UI for guiding a user's manipulation to perform reconnection with the remote control device.

The providing the UI may include, based on identification information of the remote control device not matching the identification included in the Bluetooth pairing history, providing a UI for guiding a user's manipulation to perform pairing with the remote control device.

Identification information of the target device may be stored in a field assigned to record custom data in the undirected advertising packet.

The preset IR signal may be a signal to control the electronic device to operate in the scan state.

The controlling to operate in a scan state may include, based on first information included in the received IR signal matching preset first information, identifying whether preset second information is included in the IR signal, and based on the second information being included in the IR signal, controlling the electronic device to operate in a scan state capable of receiving the undirected advertising packet.

The preset first information may be manufacturer information, and the preset second information may be information to control the second communication unit to operate in a scan state.

DETAILED DESCRIPTION

Figure 1:
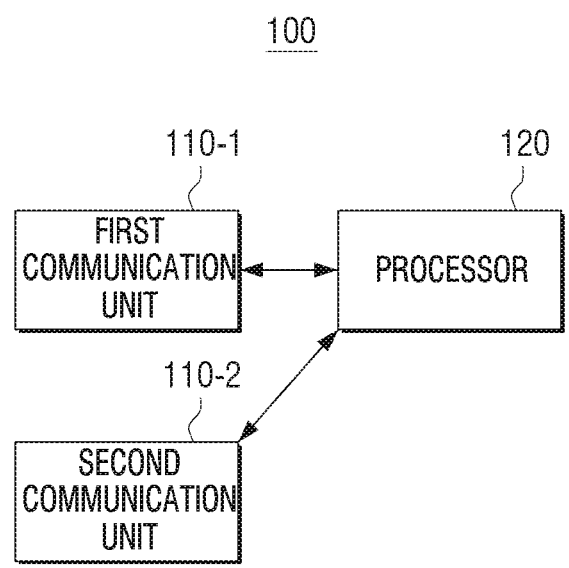
FIG. 1 is a block diagram illustrating an electronic device according to an embodiment.

After terms used in the present specification are briefly described, the disclosure will be described in detail.

The terms used in the disclosure and the claims are general terms identified in consideration of the functions of the various embodiments of the disclosure. However, these terms may vary depending on intention, technical interpretation, emergence of new technologies, and the like, of those skilled in the related art. Unless a specific definition of a term is provided, the term may be understood based on the overall content and technological understanding of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use, order of arrangement, or the like, by the numbers. If necessary, the ordinal numbers may be replaced with each other.

A singular expression includes a plural expression, unless otherwise specified. It is to be understood that the terms such as "comprise" or "consist of" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. A detailed description of known configurations related to the disclosure may be omitted so as to not obscure the gist of the disclosure.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any part is connected to another part, this includes a direct connection and an indirect connection through another medium. Further, when a certain part includes a certain element, unless specified to the contrary, another element may be additionally included, rather than precluding another element.

FIG. 1 is a block diagram illustrating an electronic device according to an embodiment Referring to FIG. 1, the electronic device may include a first communication unit 110, a second communication unit 110-2 and a processor 120.

The first communication unit 110 may be implemented as an optical receiving module for receiving an infra-red (IR) signal. The first communication unit 110 receives an optical signal, such as an IR signal, through an optical window (not shown). The IR signal received through the first communication unit 110 may be a signal for controlling the electronic device 100, or may be a signal for controlling another device that is received by IR sniffing.

The second communication unit 110-2 performs a function to perform Bluetooth communication, and can be implemented as a Bluetooth communication module. Accordingly, the second communication unit 110-2 may receive various types of Bluetooth packets according to the Bluetooth communication standard, for example, a direct advertising packet, an undirected advertising packet, or the like.

The processor 120 may perform an overall control operation of the electronic device 100.

The processor 120 according to an embodiment may be implemented with at least one of a digital signal processor (DSP), a microprocessor, and a time controller (TCON), a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor may be implemented in a system on chip (SoC) type or a large scale integration (LSI) type in which a processing algorithm is built therein or in a field programmable gate array (FPGA) type.

The processor 120 may identify whether the IR signal received through the first communication unit 110 is a preset IR signal. Here, the preset IR signal may include a code for causing the second communication unit 110-2 to operate in a Bluetooth scan state.

If the first information included in the received IR signal matches the preset first information, the processor 120 can identify whether the preset second information is included in the received IR signal. Here, the second information may be information for controlling the second communication unit 110-2 to operate in a scan state.

For example, the processor 120 may identify whether the preset second information is included in the received IR signal only when the first information included in the received IR signal, that is, only when the manufacturer information is information about a specific manufacturer, and if the preset second information is included in the received IR signal, the processor 120 may control so that the second communication unit 110-2 operates in a scan state.

The reason why the processor 120 first identifies the first information in the received IR signal is that the IR signal received from the remote control device manufactured by another manufacturer can be ignored. If the manufacturer information is identified earlier than the second information controlling the scan state, the processing speed can be improved.

If a command to perform a scan operation to receive an undirected advertising packet is included in the received IR signal, the processor 120 may control to switch the state of the electronic device 100 or the state of the second communication unit 110-2 to the scan state. The scan state may be a state capable of receiving (or scanning or reading) the undirected advertising packet.

The processor 120 may control so that the second communication unit 110-2 operates in a scan state to receive the undirected advertising packet.

When the second communication unit 110-2 is in the scan state, if the undirected advertising packet is received from the remote control device 200, the processor 120 can obtain the identification information of the remote control device 200 and the identification information of the target device from the undirected advertising packet. Here, the identification information of the target device may be address information of the target device (or destination), for example, media access control (MAC) address information. Generally, a field for recording destination information is not defined in an undirected advertising packet according to a Bluetooth communication standard, but according to an embodiment, address information of a target device can be included in a field (e.g., a custom data field) assigned to each manufacturer and transmitted.

The target device is a device to try Bluetooth connection by the remote control device 200, and if the pairing between the remote control device 200 and the electronic device 100 is made, the remote control device 200 may include the identification information of the electronic device 100 in the undirected advertising packet and transmit the same.

The processor 120 may provide a user interface (UI) to guide Bluetooth connection with the remote control device 200 if the identification information of the target device obtained from the undirected advertising packet matches the identification information of the electronic device 100. That is, the processor 120 may identify that the corresponding remote control device 200 tries to connect a Bluetooth connection based on the identification information of the remote control device 200 obtained from the undirected advertising packet, and may provide a UI to guide a Bluetooth connection with the remote control device 200.

If the identification information of the target device does not match the identification information of the electronic device 100, it is not necessary to provide a guide for the Bluetooth connection. This is because the target device which the remote control device 200 wishes to make a Bluetooth connection is not the electronic device 100.

If the identification information of the target device included in the undirected advertising packet matches the identification information of the electronic device 100, the processor 120 can identify whether the identification information of the remote control device 200 included in the undirected advertising packet matches the identification information included in the Bluetooth pairing history of the electronic device 100. If it is identified that the identification information of the remote control device 200 matches the identification information included in the Bluetooth pairing history of the electronic device 100, the processor 120 can provide a first UI for guiding the Bluetooth connection with the remote control device 200. Here, the first UI for guiding the Bluetooth connection may include at least one of a UI guiding that the electronic device 100 is not connected to the remote control device 200, and a UI guiding user manipulation to retry the Bluetooth pairing. That is, the first UI may be provided if the identification information of the target device in the undirected advertising packet matches the identification information of the electronic device 100, and the identification information of the remote control device 200 matches the identification information included in the Bluetooth pairing history of the electronic device 100.

If the processor 120 identifies that the identification information of the remote control device 200 does not match the identification information included in the Bluetooth pairing history of the electronic device 100, the processor 120 can provide the second UI for guiding the Bluetooth connection. In this case, the second UI may include at least one of a UI guiding that the electronic device 100 is paired with another remote control device and a UI guiding user manipulation for Bluetooth pairing. That is, the second UI may be provided if the identification information of the target device in the undirected advertising packet matches the identification information of the electronic device 100, but the identification information of the remote control device 200 does not match the identification information included in the Bluetooth pairing history of the electronic device 100.

The processor 120 can provide a UI similar to the first UI even when there is no identification information in the pairing history of the electronic device 100. That the identification information of the electronic device 100 is included in the undirected advertising packet received from the remote control device 100 may be seen such that the remote control device 200 and the electronic device 100 are paired, but the pairing information stored in the electronic device 100 is deleted due to any reason. In this case, the processor 120 may provide at least one of a UI guiding that the electronic device 100 is not connected to the remote control device 200 and a UI guiding manipulation to retry the Bluetooth pairing.

The UI guiding a user's manipulation for Bluetooth connection may include, for example, a guide to press a and b buttons of the remote control device 200 at the same time. When the user presses a and b buttons, the electronic device 100 may perform an operation for Bluetooth connection or reconnection.

In some cases, the provided UI may include a content that Bluetooth pairing between the devices is unable. (As illustrated in the attached figures explaining UI) As described above, if the Bluetooth connection is not normally performed for reasons such as loss of pairing information after the Bluetooth pairing, or the like, a cause can be identified and the user can be guided with the cause, and the user can be guided with the operation content suitable for each situation.

Figure 2:
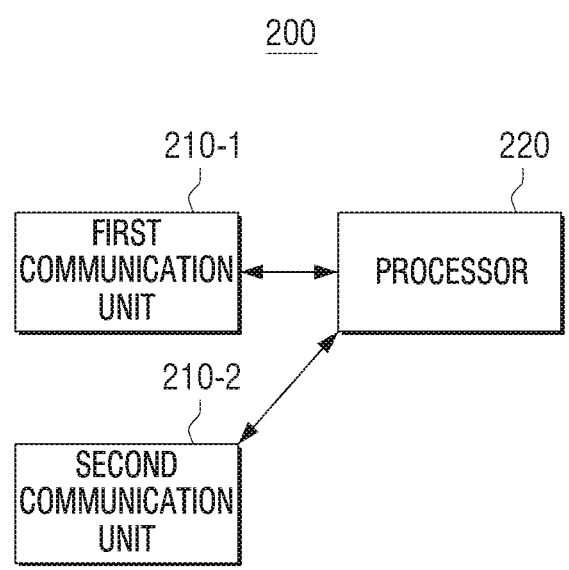
FIG. 2 is a block diagram illustrating a remote control device according to an embodiment.

FIG. 2 is a block diagram illustrating a remote control device according to an embodiment.

The remote control device 200 according to FIG. 2 may include a first communication unit 210-1, a second communication unit 210-2, and a processor 220.

The first communication unit 210-1 may perform Bluetooth communication, and can be implemented as a Bluetooth communication module. Accordingly, the second communication unit 210-2 may transmit various types of Bluetooth packets according to the Bluetooth communication standard, for example, a directed advertising packet, an undirected advertising packet, or the like.

The second communication unit 210-2 may be implemented as an optical communication module that transmits an infra-red (IR) signal. The IR signal transmitted through the first communication unit 210 may be a signal for controlling the electronic device 100, or may be a signal for controlling another device received by IR sniffing.

The processor 220 may be implemented in a type similar to the processor 120 of the electronic device 100 described in FIG. 1 and a duplicate description will be omitted.

The processor 220 may identify whether the first communication unit 210-1 is Bluetooth-paired (or in Bluetooth pairing) when a user command is input. Here, the user command may be in the form of pressing any button provided in the remote control device 100, but is not limited thereto.

If it is identified that the first communication unit 210-1 is Bluetooth-paired with an external device, the processor 220 can identify whether the first communication unit 210-1 is Bluetooth-connected with the external device. If the first communication unit 210-1 is not Bluetooth-connected with the external device, the processor 220 can transmit the directed advertising packet including the identification information of the external device for the Bluetooth connection with the external device for a preset time. The directed advertising packet may refer to a packet to transmit specific information by specifying certain information. If Bluetooth connection with the external device is not made for a preset period of time, the processor 220 can transmit a preset IR signal to cause the external device to operate in a scan state capable of receiving the undirected advertising packet to the external device using the second communication unit 210-2 of the remote control device 200. Here, the preset IR signal may include a code for controlling a manufacturer code and a scan state.

The undirected advertising packet including the identification information of the external device may be broadcast through the first communication unit 210-1. The advertising refers to a process of informing information at a certain period or at a specific time between devices performing communication. The advertising packet refers to a data packet including its own information or peripheral information (routing information).

The identification information of the external device of the target device may be included in a field assigned to each manufacturer in the undirected advertising packet, for example, a field assigned to record custom data.

Figure 3:
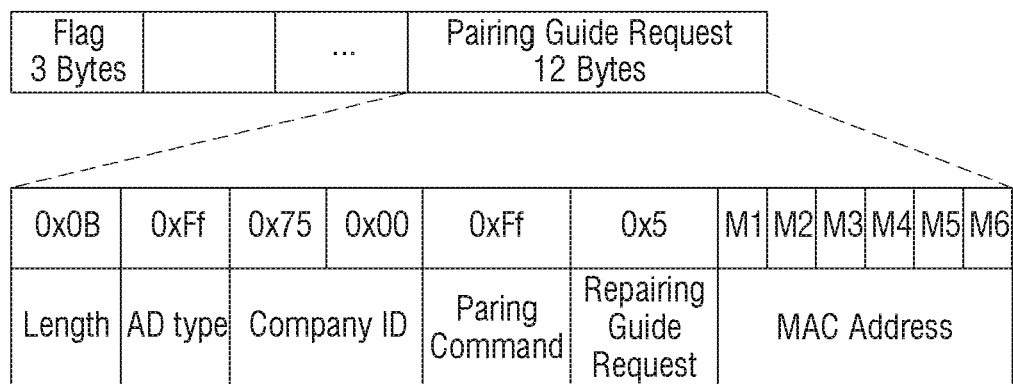
FIG. 3 is a diagram illustrating a structure of an undirected advertising packet.

FIG. 3 is a diagram illustrating a structure of an undirected advertising packet.

Referring to FIG. 3, the remote control device 200 may include not only information about a remote control device but also information of the electronic device 100 in the undirected advertising packet.

In general, the undirected advertising packet does not include destination information, but the undirected advertising packet according to an embodiment may include destination information.

For example, the MAC address of the electronic device 100 may be included in the manufacturer allocation area (M1 to M6) of the undirected advertising packet. However, the embodiment is not limited thereto, and various reserve areas may be used.

Figure 4:
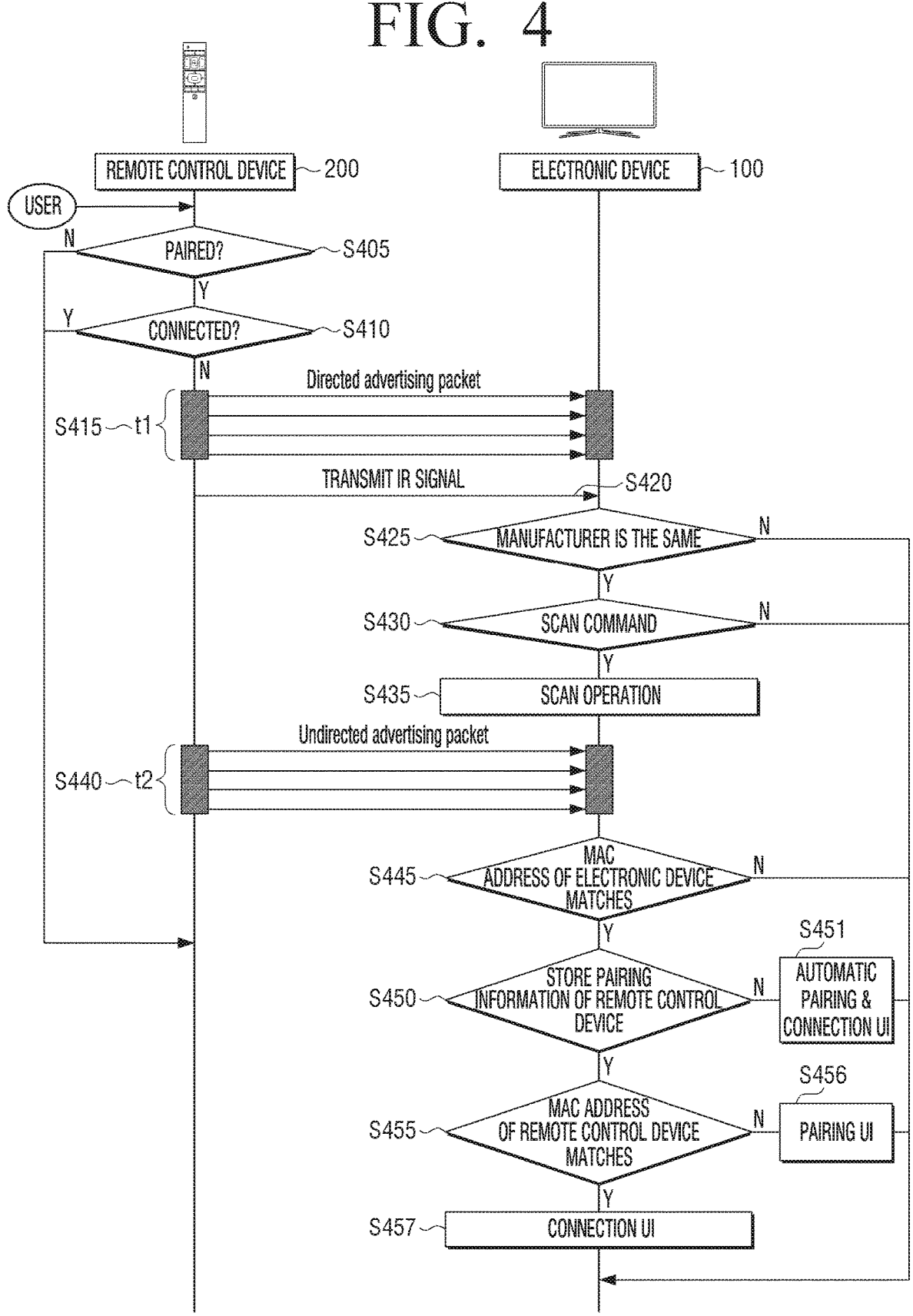
FIG. 4 is a diagram illustrating a method for providing a user interface (UI) for guiding Bluetooth connection between a remote control device and an electronic device.
Figure 5:
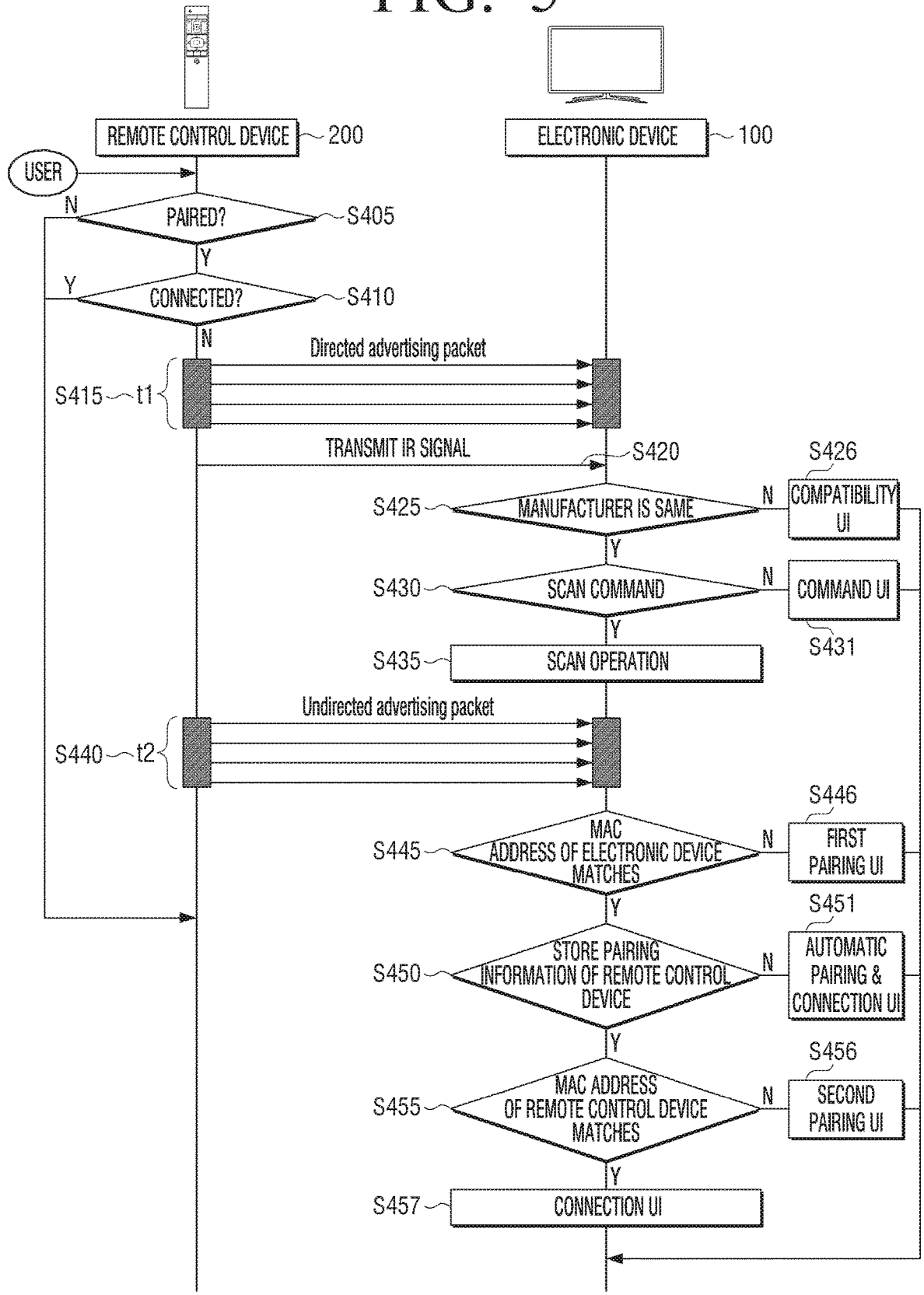
FIG. 5 is a diagram illustrating a method for providing a user interface (UI) for guiding Bluetooth connection between a remote control device and an electronic device.

FIGS. 4 and 5 are diagrams illustrating a method for providing a user interface (UI) for guiding Bluetooth connection between a remote control device and an electronic device.

According to various embodiments, a UI for Bluetooth connection may be provided as a speech through not only a display but also a speaker.

When a press manipulation of an arbitrary button is done in the remote control device 200, the remote control device 200 may identify whether the Bluetooth communication function is usable. The remote control device 200 may check whether the Bluetooth pairing is made.

If the Bluetooth pairing has been performed in the past, since the pairing information is stored in the remote control device 200, the remote control device 200 can check whether the Bluetooth pairing is paired using the stored pairing information in operation S405.

The remote control device 200 can check whether the Bluetooth connection is normally made using the Bluetooth pairing information in operation S410. If a Bluetooth connection is made, the user may control the electronic device 100 using the Bluetooth remote control device 200. However, if a Bluetooth connection is not made, the user cannot control the electronic device 100 using the remote control device 200.

In this case, in order to try Bluetooth connection, the remote control device 200 may transmit the directed advertising packet for a preset time t1 in operation S415. The directed advertising packet is a data packet in which a target is determined, and the remote control device 200 can assign a target of the directed advertising packet to the electronic device 100 using the pairing information stored in the remote control device 200. There may be pre-stored pairing information in the remote control device 200, and the pairing information may include an address value of a device in which there was a Bluetooth connection in the past. The remote control device 200 may transmit the directed advertising packet to the address value of the apparatus for a preset time t1. Here, the preset time may be preferably 7.5 seconds, which may be changed by manufacturer settings or user settings.

The remote control device 200 may transmit a preset IR signal to the electronic device 100 if the Bluetooth connection is not normally performed after a preset period of time has passed since the directed advertising packet is transmitted in operation S420. The IR signal may be a signal that controls the electronic device 100 to be in a scan state. The scan state may be a state capable of receiving (or reading) an undirected advertising packet or an undirected advertising packet. In order to receive the undirected advertising packet transmitted from the remote control device 200, the electronic device 100 must be in a scan state for receiving the electronic device 100.

The IR signal transmitted by the remote control device 200 may include manufacturer identification information and the information to control the scan state.

If the IR signal is received from the remote control device 200, the electronic device 100 may analyze the received IR signal to identify whether the manufacturer information of the remote control device 200 is the same as the manufacturer information of the electronic device 100 in operation S425. According to an embodiment, in order for the electronic device 100 to recognize the scan state control command in the IR signal received from the remote control device 200, there should be an appointment for a corresponding command between the electronic device 100 and the remote control device 100. Accordingly, after the manufacturer information is first confirmed, only if the manufacturer information matches, a subsequent operation can be performed.

When it is determined that manufacturer information matches, the electronic device 100 may determine whether the IR signal includes a command to control the scan state, that is, a corresponding code in operation S430.

If it is determined that a scan state control code is included in the IR signal received from the remote control device 200, the electronic device 100 can switch to the scan state to perform the scan operation. When the electronic device 100 is switched to a scan state, the electronic device 100 may receive an undirected advertising packet transmitted from the remote control device 200.

In operation S440, the remote control device 200 may transmit the undirected advertising packet for a preset time t2 after a preset period of time has elapsed since the IR signal is transmitted. Since an undirected advertising packet is transmitted without deciding a specific object, any device capable of scanning an undirected advertising packet may be able to receive any device. Here, t2 may preferably be 10 seconds, but this may be changed by the user's setting.

As the target is not fixed, the undirected advertising packet can be received in various devices. The electronic device 100 may receive the undirected advertising packet transmitted by the remote control device 200 in a scan state.

The electronic device 100 may analyze information included in the undirected advertising packet. The electronic device 100 may analyze identification information included in the undirected advertising packet received from the remote control device 200.

Specifically, the identification information included in the undirected advertising packet may be information related to pairing information. In general, identification information of the remote control device 200 may be included in an undirected advertising packet. In the embodiment, identification information about a target device (external device) included in the pairing information of the remote control device 200 may be additionally included in the undirected advertising packet.

Here, the identification information may be a MAC address. The identification information included in the undirected advertising packet may include both a MAC address indicating the remote control device 200 and a MAC address of an external device (target device) connected to the remote control device 200.

The electronic device 100 can determine whether the identification information (MAC address) of the external device (the target device) included in the undirected advertising packet received by the remote control device 200 and the prestored identification information (MAC address) of the electronic device 100 match with each other in operation S445.

If the identification information (MAC address) of the external device (target device) included in the undirected advertising packet and the identification information (MAC address) previously stored in the electronic device 100 do not match, the electronic device 100 can determine that Bluetooth connection is not necessary.

If the identification information (MAC address) of the external device (target device) included in the undirected advertising packet received by the remote control device 200 and the identification information (MAC address) prestored in the electronic device 100 match with each other, the electronic device 100 can determine that Bluetooth connection is necessary, and then may perform the following operations (S450, S455). Since the identification information (MAC address) of the electronic device 100 refers to the identification information of the electronic device 100, the identification information may be always stored in a memory of the electronic device 100 regardless of whether or not the pairing information is stored.

The electronic device 100 may analyze identification information of the remote control device 200 through operations S450 and S455.

The electronic device 100 may determine whether the pairing information is stored in the memory of the electronic device 100 in operation S450. The electronic device 100 can determine whether the pairing information itself is stored in the electronic device 100 itself before analyzing the information included in the undirected advertising packet received from the remote control device 200. The meaning that the pairing information itself is not stored may mean that no pairing history is stored. In a standpoint of the electronic device 100, this may mean a recognition that Bluetooth connection has never been performed. For example, although a Bluetooth connection is actually performed, the pairing information stored in the electronic device 100 may be damaged due to a damage of the memory or an unexpected error.

If the electronic device 100 identifies that the pairing information is not stored in the electronic device 100, the electronic device 100 can automatically perform Bluetooth pairing with the remote control device 200 that transmitted the undirected advertising packet and may provide the connection UI to the user in operation S451. In this case, the electronic device 100 does not need to compare the identification information (MAC address) of the remote control device 200 included in the undirected advertising packet. Since the electronic device 100 has already lost pairing information, there is no object to be compared with the identification information (MAC address) of the remote control device 200 included in the undirected advertising packet.

If it is determined that the pairing information is not stored in the electronic device 100, the electronic device 100 can automatically perform Bluetooth pairing with the remote control device 200. This is because it has already been determined in operation S445 that the identification information (MAC address) of the electronic device 100 is included in the undirected advertising packet received from the remote control device 200 in operation S445. The remote control device 200 has already identified the identification information (MAC address) of the electronic device 100, although there is no pairing information in the electronic device 100, the electronic device 100 can determine that the remote control device 200 is a target for which a Bluetooth connection is to be performed.

Thus, the electronic device 100 can automatically perform a pairing operation with the remote control device 200. The electronic device 100 may provide a guide UI for connection with the paired remote control device 200 for the Bluetooth connection to the user. Here, the UI may be a connection UI. The connection UI may include the content that the Bluetooth connection is unable currently, and may include content for guiding a specific operation for the Bluetooth reconnection to the user. A specific embodiment of the operation of providing the connection UI in operation S451 will be described later with reference to FIG. 10B.

If the electronic device 100 determines that the pairing information is stored in the electronic device 100, the electronic device 100 may determine whether the identification information (MAC address) with the remote control device 200 included in the undirected advertising packet matches in operation S455.

Specifically, by analyzing the undirected advertising packet received from the remote control device 200, identification information (MAC address) indicating identification information of the remote control device 200 may be obtained. Using pairing information stored in the electronic device 100, whether the identification information matches the identification information (MAC address) indicating the identification information of the remote control device 200 may be identified. The pairing information stored in the electronic device 100 may include information on a remote control device in which a Bluetooth connection was made. Accordingly, by analyzing the undirected advertising packet received from the remote control device 200, the identification information (MAC address) of the remote control device 200 may be obtained, and the obtained identification information (MAC address) of the remote control device 200 can be compared with the identification information (MAC address) of the remote control device included in the previously stored pairing information.

If the identification information (MAC address) of the remote control device 200 included in the undirected advertising packet and the identification information (MAC address) of the remote control device 200 stored in the electronic device 100 do not match, the electronic device 100 may provide the pairing UI in operation S456. The pairing UI may be a UI indicating that the pairing information of the remote control device 200 and the electronic device 100 trying to make Bluetooth connection does not match. A specific embodiment of the operation of providing the pairing UI in operation S456 will be described below with reference to FIG. 11B.

If the identification information (MAC address) of the remote control device 200 included in the undirected advertising packet and the identification information (MAC address) of the remote control device stored in the electronic device 100 match, the electronic device 100 can display the connection UI in operation S457. The connection UI may be the UI same as the connection UI displayed in step S451. A detailed embodiment of the operation of providing the connection UI in operation S457 will be described later with reference to FIG. 6B.

Referring to FIG. 5, an embodiment of providing a UI additionally in the electronic device 100 is described.

Although the electronic device 100 has been described as providing only a connection UI and a pairing UI in FIG. 4, the electronic device 100 can provide various information to the user by providing additional UI. Specifically, operations of S426, S431, and S446 may additionally be included. Here, the operations of S426, S431, and S446 should not be all included together. The electronic device 100 may add at least one of the operations of S426, S431, and S446.

In operation S425, the electronic device 100 may check whether the manufacturer is identical based on the IR signal received from the remote control device 200. If a preset part representing the same manufacturer is included in the IR signal, the electronic device 100 can determine that the manufacturer of the remote control device 200 is identical. If the preset part representing the same manufacturer is not included in the IR signal, the electronic device 100 may provide a compatibility UI in operation S426. A point in time of providing the compatibility UI may be limited to a case where the electronic device 100 recognizes that the user has already tried Bluetooth connection. The electronic device 100 can receive various IR signals and if a specific UI is provided only for a reason that no manufacturer information is included in the IR signal, no other remote control device controlling the set-top box connected to the TV can be used. A specific embodiment of the operation to provide the compatibility UI in operation S426 will be described below with reference to FIG. 7B.

Therefore, a case where the operation S426 is performed can be limited to a case where the electronic device 100 is clearly aware that the user is trying Bluetooth connection. For example, the user may select a Bluetooth setting button or select a Bluetooth setting UI portion. The point in time may be when a signal related to a request for Bluetooth connection is received from the remote control device 200, or when the electronic device 100 internally recognizes that Bluetooth connection is not made. This point can be applied to all parts of providing the UI in describing the disclosure.

The compatibility UI may include the content that a manufacturer of the remote control device 200 currently used is not the same as the manufacturer of the electronic device 100, and may be difficult to be compatible. The user may easily recognize that a wrong remote control device 200 is used through the compatibility UI. The compatibility UI may include at least one of the content that the manufacturer is different, the compatibility is unable, or a signal is not recognizable.

The electronic device 100 can identify whether information related to the scan command is included in the IR signal received from the remote control device 200 in operation S430. If the information related to the scan command is included in the IR signal received from the remote control device 200 in operation S430, the electronic device 100 may perform a scan operation in the electronic device 100. Alternatively, the electronic device 100 may control the operation of the electronic device 100 to switch to a scan state. However, if the information related to the scan command is not included in the IR signal received from the remote control device 200 in operation S430, the electronic device 100 may provide the command UI in operation S431.

The command UI may be a UI informing the user that the signal corresponding to the scan command is not received in the IR signal received from the remote control device 200. The command UI may be a UI which is displayed when the IR signal includes information of being transmitted by the same manufacturer, but does not include a scan command. Specifically, the command UI may include that no scan command is included in the received IR signal. A specific embodiment of the operation of providing the command UI in operation S431 will be described below with reference to FIG. 8B.

The electronic device 100 can identify the identification information (MAC address) of the external device (target device) included in the undirected advertising packet and the identification information (MAC address) stored in the electronic device 100 itself in operation S445. If the identification information (MAC address) stored in the electronic device 100 and the identification information (MAC address) of the external device (target device) included in the undirected advertising packet do not match, the electronic device 100 can determine that the pairing information does not match.

Here, if the electronic device 100 identifies that the pairing information does not match, the electronic device 100 may display the pairing UI. The pairing UI may be a UI indicating that the pairing information does not match. It may be the same UI as the pairing UI provided in operation S456 of FIG. 4.

The electronic device 100 can provide the pairing UI in a distinguished manner. For example, the pairing UI of the operation S446 and the operation S456 can be distinguished and displayed. A specific embodiment of the operation of providing the pairing UI in operation S446 will be described below with reference to FIG. 9B. A specific embodiment of the operation of providing the pairing UI in operation S456 will be described below with reference to FIG. 11B. Specifically, if the identification information (MAC address) of the electronic device (external device) does not match, the electronic device 100 may indicate that the remote control device (remote control device) is already paired with another TV (electronic device). If the identification information (MAC address) of the remote control device does not match, the electronic device 100 may indicate that the TV (electronic device) is already paired with another remote control device (remote control device). However, the embodiment described above is only one embodiment, and in actual implementation, it is not necessary to separately provide the pairing UI in the electronic device 100 as shown in FIGS. 9B and 11B. The electronic device 100 may display a simple content that pairing information does not match, in providing the pairing UI.

Meanwhile, the compatibility UI or command UI mentioned in FIG. 5 may not be displayed in a general situation. When a compatibility UI or command UI is displayed corresponding to all IR signals, the user will display a specific UI even in transmitting an IR signal such as a channel up button.

The electronic device 100 may be implemented by adding any one UI mentioned in FIG. 5.

FIGS. 6 to 12 are diagrams illustrating a method for providing a UI according to an embodiment.

Figure 6A:
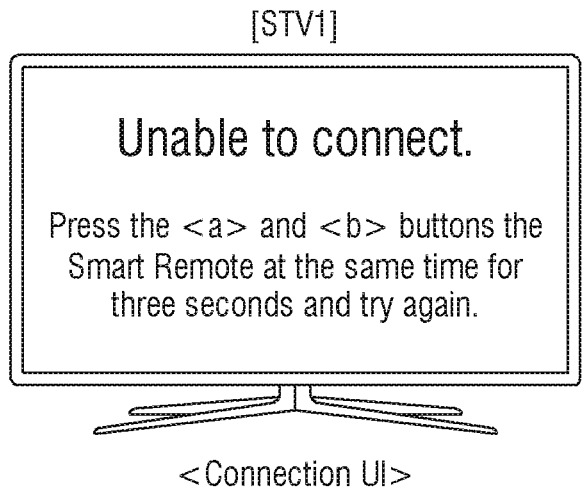
FIGS. 6A, 6B, 7A, 7B, 8A, 8B, 9A, 9B, 10A, 10B, 11A, 11B, 12 are diagrams illustrating a method for providing a UI according to an embodiment.
Figure 6B:
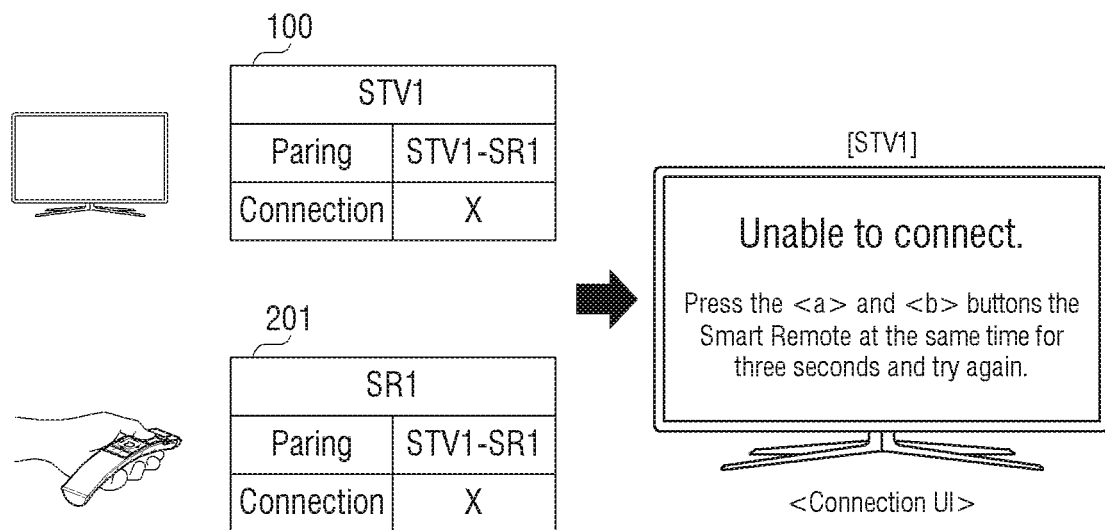

FIG. 6A is a diagram illustrating a UI provided to a user.

Referring to FIG. 6A, the connection UI may include the content that the Bluetooth connection is unable currently, and may include content for guiding a specific operation for the Bluetooth reconnection to the user. For example, a guide to press the a and b buttons of the remote control device 200 may be provided. If the user presses the a and b buttons, the electronic device 100 may perform operations for Bluetooth reconnection.

FIG. 6 illustrates a first embodiment in which the Bluetooth connection of a TV and a remote control device has an error. It is assumed that STV1 (TV, electronic device, 100) and SR1 (remote control device, remote control device, 201) are Bluetooth-paired. It is assumed that STV1 and SR1 are Bluetooth-paired, but the Bluetooth connection is not made. The electronic device 100 may determine that the identification information included in the undirected advertising packet received from the remote control device 200 and the pairing information (STV1-SR1) stored in the electronic device 100 are identical. Here, the electronic device 100 can display a connection UI in operation S457. The connection UI can be the UI of FIG. 6A.

Figure 7A:
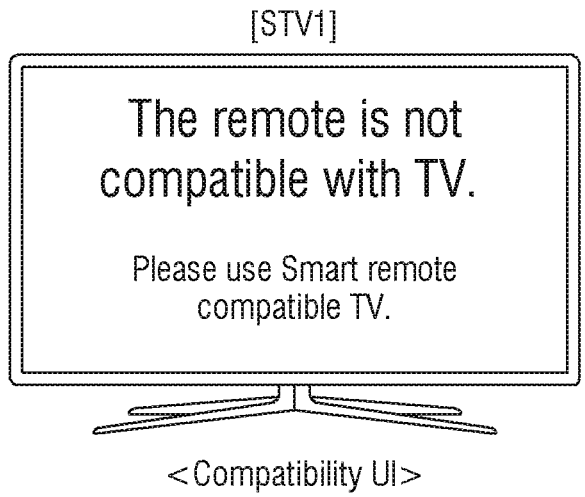

FIG. 7A is a diagram illustrating a UI provided to a user. The UI included in FIG. 7A can be a compatibility UI and can be a UI indicating whether Bluetooth communication between the remote control device 200 and the electronic device 100 is able. If the information about the manufacturer of the electronic device 100 is different from the information about the manufacturer of the remote control device 200, the compatibility UI may include information that the manufacturers are different. For example, the electronic device 100 may include a content that "the manufacturer of the remote control device 200 and the manufacturer of the electronic device 100 are different, so please use a compatible remote control device." The electronic device 100 can simply include only the content, "please use a remote control device that is compatible" without information about a manufacturer.

Figure 7B:
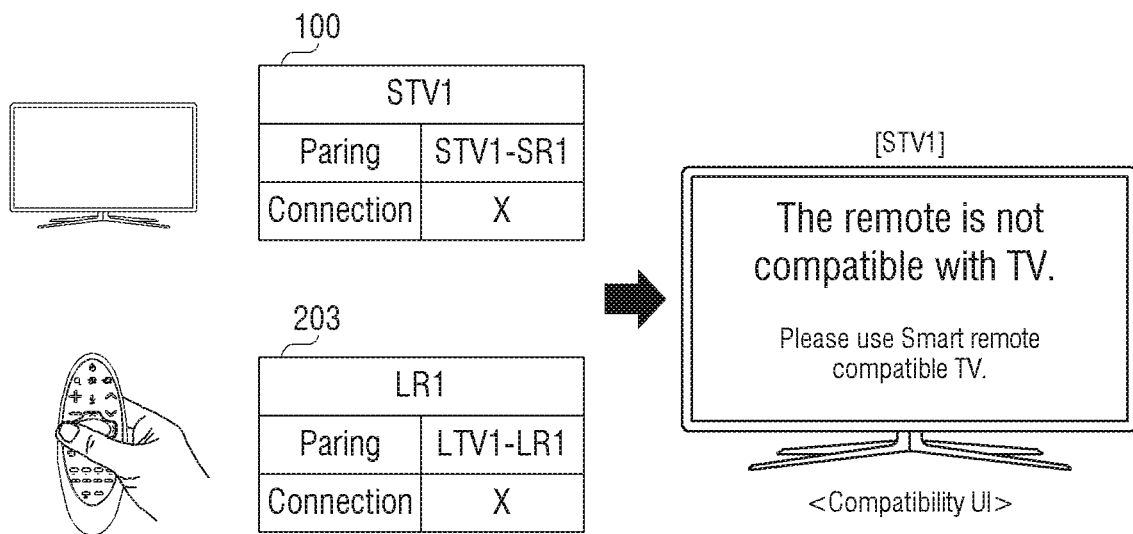

FIG. 7B illustrates a second embodiment in which the Bluetooth connection of the TV and the remote control device has an error. It is assumed that STV1, (TV, electronic device, 100) and SR1 (remote controller, remote control device, 201) are Bluetooth-paired. It is assumed that STV1 and SR1 are Bluetooth-paired, but the Bluetooth connection is not made. Also, it is assumed that there is an LTV1 203 of which a manufacturer is different from the manufacturer of STV1, and there is a remote control device of LR1of which the manufacturer is different from the manufacturer of SR1. In other words, STV1 and SR1 are products manufactured by S manufacturer, and LV1 and LR1 are products manufactured by L manufacturer.

In general, when an IR signal is transmitted from the remote control device 200, information capable of identifying a manufacturer can be included. Therefore, the IR signal transmitted from the LR1 will be different from the IR signal transmitted from the SR1. The electronic device 100 may identify whether the preset manufacturer information is included in the received IR signal, and if the preset manufacturer information is not included, the UI of the content that compatibility is not able may be displayed. Specifically, the UI of FIG. 7A can be displayed. An embodiment of FIG. 7B can occur in operation S426 of FIG. 5.

A point in time of providing the compatibility UI can be limited when the electronic device 100 recognizes that the user has already tried Bluetooth connection. The electronic device 100 can receive various IR signals, and if a specific UI is provided for the reason that the manufacturer information is not included in the IR signal, the other remote control device which controls the set-top box connected to the TV cannot be used at all. A specific embodiment of the operation of providing a compatibility UI will be described in FIG. 7B.

A case when the operation S426 is performed can be limited to a case when the electronic device 100 can clearly know that the user tries Bluetooth connection. For example, a case where a user selects a Bluetooth setup button or select a Bluetooth setup UI part. Also, the case may be a point in time when a signal regarding Bluetooth connection request is received from the remote control device 200, or the point in time when the electronic device 100 may recognize that Bluetooth connection is unable. This can be applied to all parts which provide a UI in describing the disclosure.

The compatibility UI can include the content that the manufacturer of the remote control device 200 currently used is not the same as the manufacturer of the electronic device 100, so that it can be difficult to be compatible. The user can easily know that an incorrect remote control device 200 is used through the compatibility UI. The compatibility UI can include at least one of the content that the manufacturer is different, content that compatibility is unable, and the content that the signal cannot be recognized.

Figure 8A:
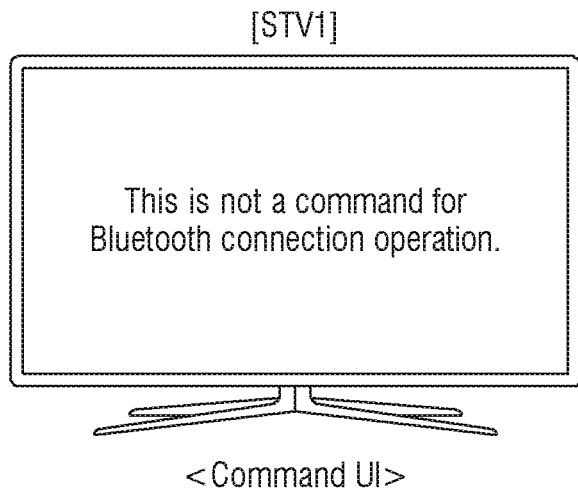

FIG. 8A is a diagram illustrating a UI provided to a user. The UI of FIG. 8A can correspond to a command UI. The command UI can be a UI informing the user that a signal corresponding to the scan command is not received in the IR signal received from the remote control device 200. The command UI may be a UI displayed when information being transmitted from the same manufacturer is included in the IR signal, but a scan command is not included. Specifically, the command UI may include the content that the scan command is not included in the received IR signal. The command UI may indicate that the current command is not a command for the Bluetooth connection operation. The command UI may indicate that the current command is not a command to perform the scan operation.

Figure 8B:
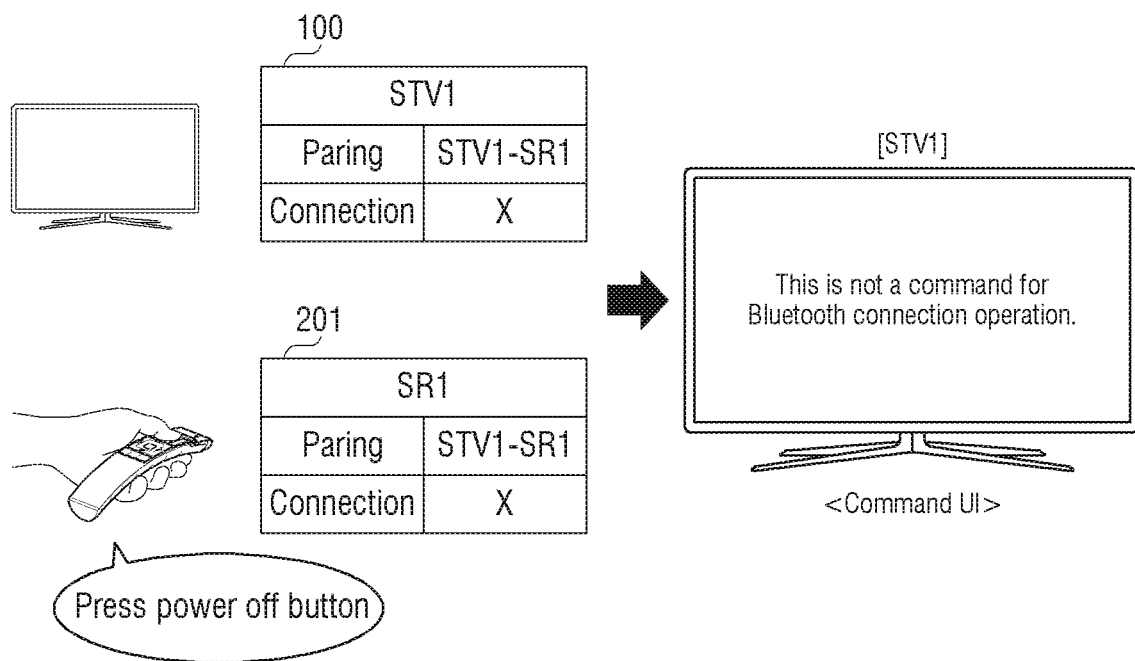

FIG. 8B illustrates a third embodiment in which the Bluetooth connection of the TV and the remote control device has an error. It is assumed that STV1 (TV, electronic device, 100) and SR1 (remote controller, remote control device, 201) are Bluetooth-paired. It is assumed that STV1 and SR1 are Bluetooth-paired, but the Bluetooth connection is not made.

In the case of a Bluetooth remote control device, a power button can communicate using at least one of an IR method and a Bluetooth method. Other buttons can communicate using a Bluetooth method only. When a button other than a power button of the remote control device 200 is pressed in a state where the Bluetooth connection is not made, the remote control device 200 can generate a preset IR signal. The preset IR signal may include information about a control command to perform the scan operation by the electronic device 100. Therefore, when the user presses a button other than the power button of the remote control device 200, the remote control device 200 may generate an IR signal to perform the scan command.

When the user presses a power button of the remote control device 200, the remote control device 200 can generate an IR signal to turn off the electronic device 100. In this case, since the electronic device 100 receives the IR signal for the power off command that is not a scan command, the electronic device 100 can display the command UI of operation S431 and turn off the power of the electronic device 100.

Figure 9A:
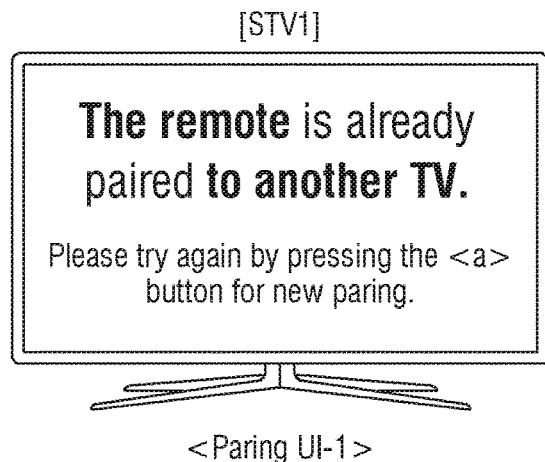
Figure 9B:
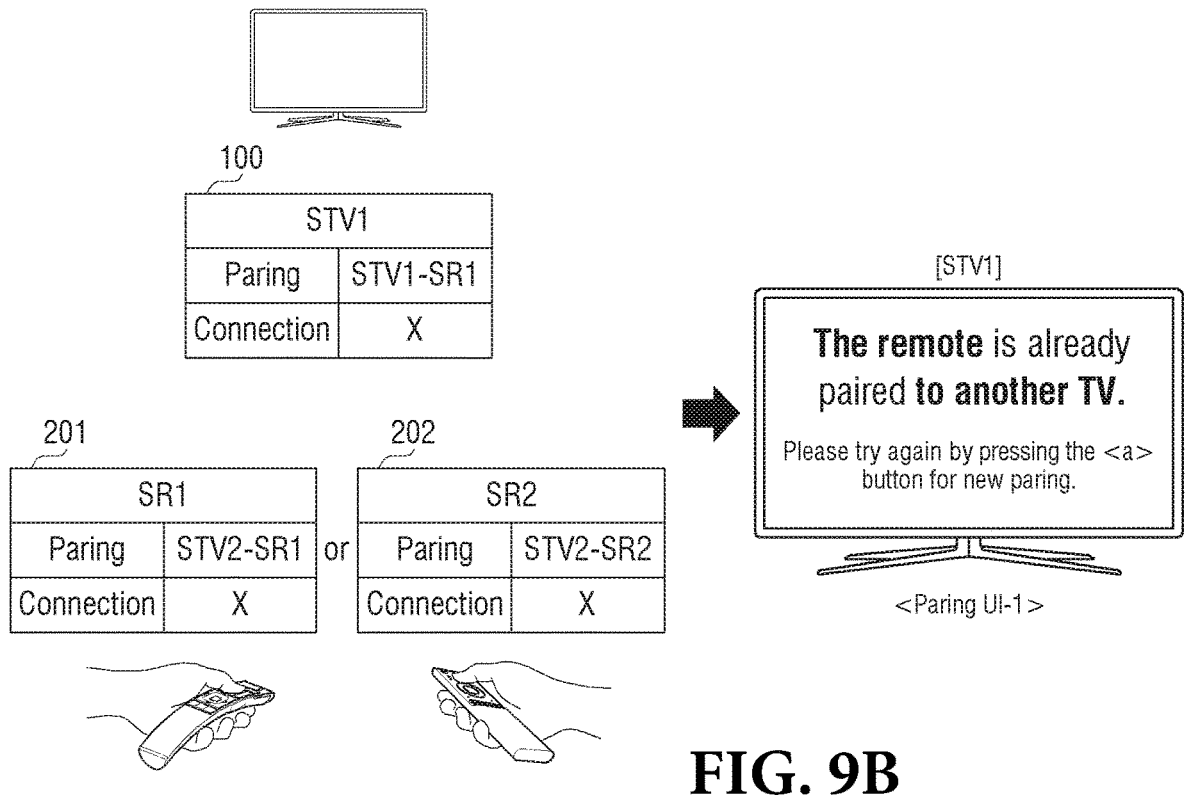

FIG. 9A is a diagram illustrating a UI provided to a user. FIG. 9A shows a pairing UI. The pairing UI may include the content that Bluetooth pairing is not performed between the devices. That is, the pairing UI can be a UI that provides the user that the Bluetooth pairing information between devices to be connected does not match.

The pairing UI may indicate two types. For convenience, the pairing UI may be divided into a first pairing UI and a second pairing UI. The pairing UI of FIG. 9A is the first pairing UI. The first pairing UI may include a content that "a remote control device has been already paired with another TV."

FIG. 9B illustrates a fourth embodiment in which the Bluetooth connection of the TV and the remote control device has an error. It is assumed that STV1 (TV, electronic device, 100) and SR1 (remote controller, remote control device, 201) are Bluetooth-paired. It is assumed that STV1 and SR1 are Bluetooth-paired, but the Bluetooth connection is not made.

It is assumed that a user performs pairing with STV2 202, which is a new device, using the SR1 remote control device. In this case, the pairing information can be stored as (STV1-SR1) in STV1. However, the pairing information may be stored as (STV2-SR1) in SR1.

The identification information may not be identical when the SR1 transmits the undirected advertising packet to the STV1, because information about STV2, which is a new TV, is already stored in the SR1 remote control device, and the identification information (MAC address) included in the undirected advertising packet is also STV2. Accordingly, in STV1, it may be determined that the identification information (MAC address) of the electronic device does not match through the operation in S445. In addition, according to operation S446, the first pairing UI of FIG. 9A can be displayed in STV1.

The same operation can be performed in the new device in addition to the device which has already been Bluetooth-paired with STV1 as SR1 described above. For example, assume that STV2 (electronic device, TV) and SR2 (remote controller, remote control device) are Bluetooth-paired. It is assumed that Bluetooth connection is tried to STV1 with the SR2 remote control device.

In the undirected advertising packet transmitted in the SR2, the information of STV2 may be included. Accordingly, STV1 may identify that the identification information of the electronic device does not match, and STV1 may provide the first pairing UI.

Figure 10A:
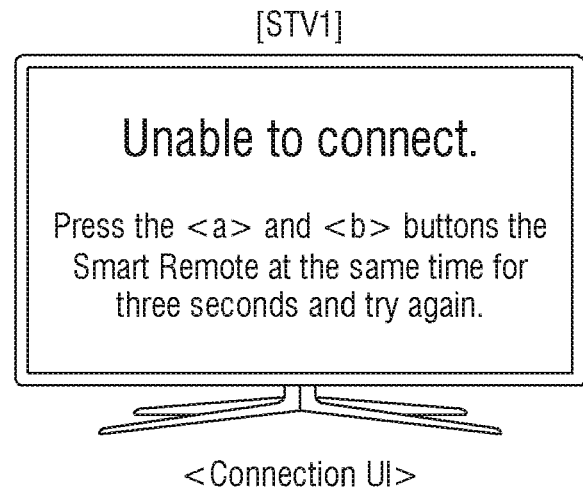

FIG. 10A is a diagram illustrating a UI provided to a user. The UI displayed in FIG. 10A can correspond to a connection UI. The connection UI may include the content that the current Bluetooth connection is unable and can include the content to guide a specific operation for the Bluetooth reconnection to the user. For example, a guide to press a and b buttons of the remote control device 200 can be provided. When the user presses a and b buttons, the electronic device 100 can perform operations for Bluetooth reconnection. The UI of FIG. 10A can be the same as the UI of FIG. 6A.

Figure 10B:
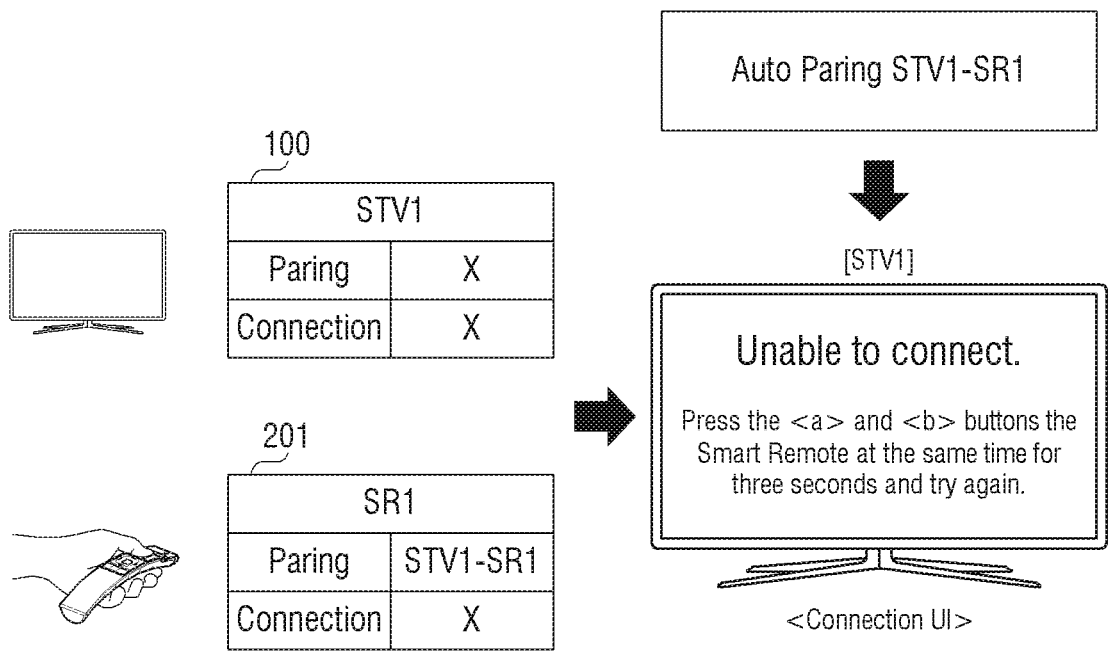

FIG. 10B illustrates a fifth embodiment in which Bluetooth connection of a TV and a remote control device has an error. The STV1 represents an electronic device and may not include pairing information. There may be a number of reasons why the STV1 does not include pairing information. If the factory initialization state, that is, if the Bluetooth connection has not been made, the Bluetooth pairing information may not be present. Also, the Bluetooth pairing information may have been stored, but the pairing information may be lost or damaged due to an unknown cause. In a typical user environment, it frequently occurs that the pairing information can be lost or damaged.

FIG. 10B illustrates a case where pairing information is lost. The STV1 and the SR1 201 may be already paired to include identification information for the STV1 on the SR1 side. However, STV1 may lose pairing information and have no identification for SR1. Here, STV1 can automatically perform Bluetooth pairing operation with SR1.

This is because it has been already determined in operation S445 that the identification information (MAC address) of the electronic device 100 is included in the undirected advertising packet received from SR1. As SR1 already has identified the MAC address of the electronic device 100, there is no pairing information in the electronic device 100, but the electronic device 100 can determine that SR1 is a target for Bluetooth connection.

Therefore, the electronic device 100 may automatically perform a pairing operation with SR1. The electronic device 100 may provide a user with a guide UI (connection UI, FIG. 10A) for Bluetooth connection with the paired SR1.

Figure 11A:
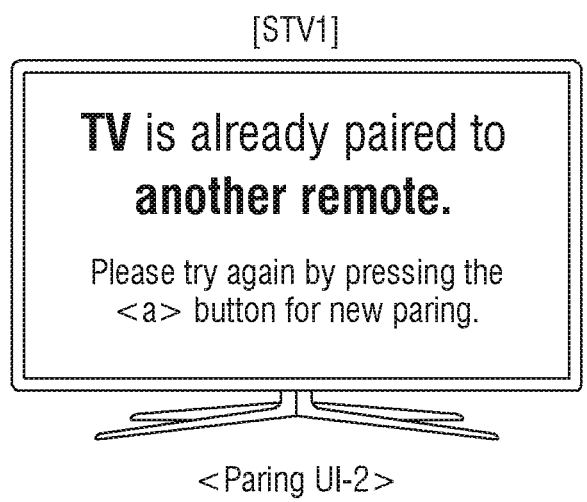
Figure 11B:
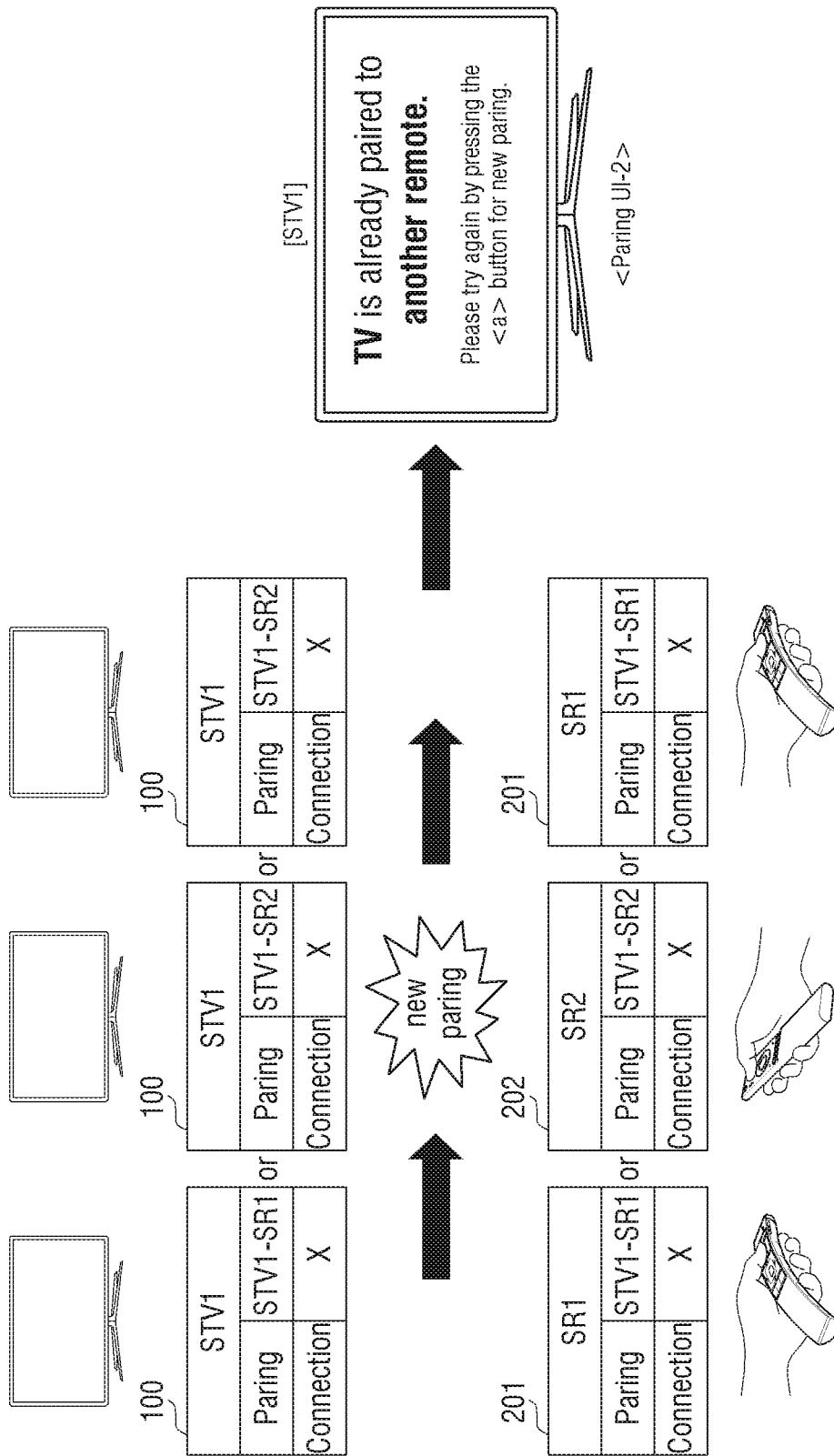

FIG. 11A is a diagram illustrating a UI provided to a user. FIG. 11A illustrates a second pairing UI. The first pairing UI and the second pairing UI may be common in that the pairing information does not match. However, the second pairing UI may be provided when the identification information of the electronic device is the same, but the identification information of the remote control device (remote control) is not the same. The second pairing UI may include the content that the TV has already been paired with the other remote control device.

FIG. 11B illustrates a sixth embodiment in which Bluetooth connection of a TV and a remote control device has an error. For example, it is assumed that the initial Bluetooth pairing has been established between the STV1 100 and the SR1 201. Both devices can store own identification information and the identification information of the other party. In other words, both the STV1 and SR1 may include pairing information of (STV1-SR1).

It is assumed that a new Bluetooth pairing has been made between STV1 and SR2 202, which is a new remote control device. It is assumed that only one Bluetooth pairing information can be stored. If so, the prestored pairing information (STV1-SR1) can be deleted in STV1 and the pairing information (STV1-SR2) can be newly stored.

Since the newly generated Bluetooth pairing has occurred in STV1 and SR2, both STV1 and SR2 may include the pairing information (STV1-SR2). However, the SR1 can store the pairing information (STV1-SR1) as previously stored.

It is assumed that the SR1 remote control device tries Bluetooth connection with the STV1. The identification information stored in STV1 is (STV1-SR2), and the identification information received through the undirected advertising packet can be (STV1-SR1). Here, the identification information of the electronic device may match, but the identification information of the remote control device (the counterpart device) may not match. If the identification information (MAC address) of the remote control device does not match, STV1 may provide second pairing UI (FIG. 11B).

Figure 12:
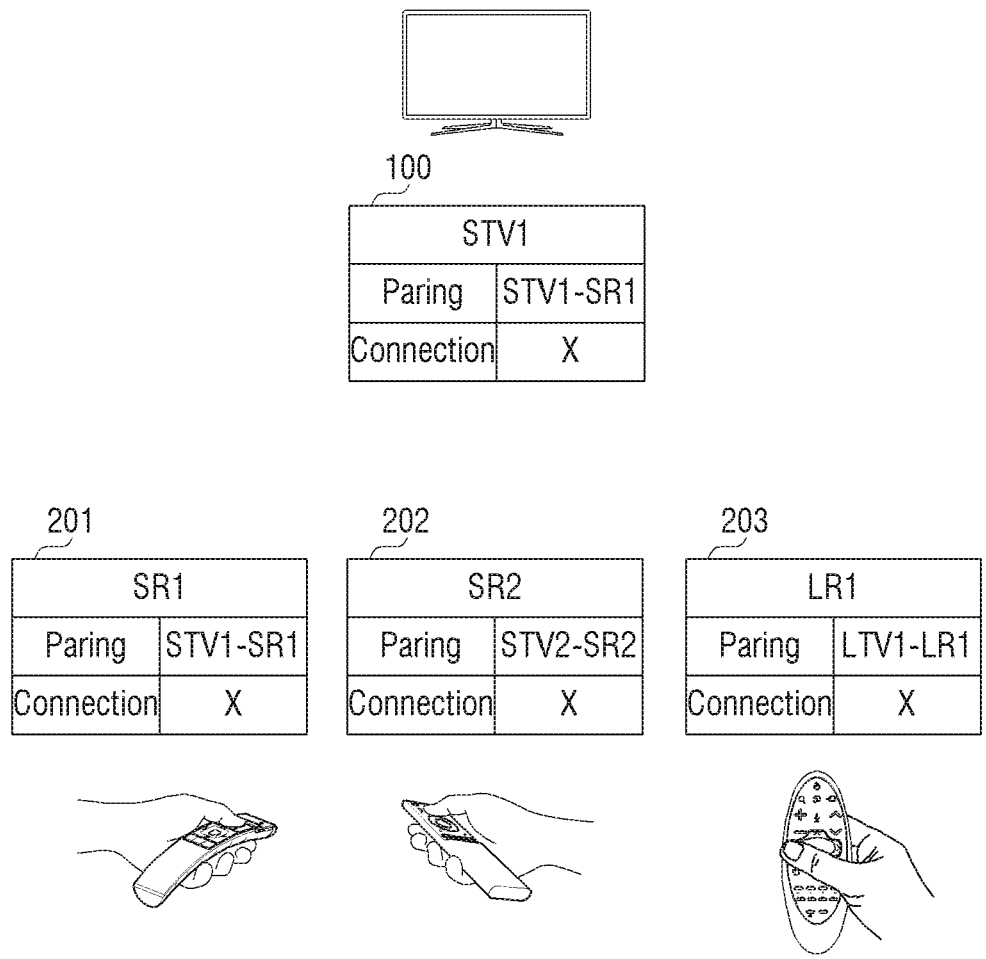

FIG. 12 is a diagram illustrating an embodiment when there are several remote control devices.

It is assumed that STV1 100 is Bluetooth paired with SR1 201, and STV1 stores Bluetooth pairing information (STV1-SR1). Similarly, it is assumed that SR1 stores Bluetooth pairing information (STV1-SR1).

It is assumed that the SR1 and other SR2 202 devices are Bluetooth paired with STV2. SR2 may include Bluetooth pairing information (SV2-SR2). SR1 and SR2 refer to the remote control device produced by the same manufacturer.

Assuming that there is a remote control device LR1 203 manufactured by the manufacturer different from SR1 and SR2, and it is assumed that the LTV1 (meaning TV manufactured by the manufacturer different from the STV1 is Bluetooth-paired. It is assumed that the LR1 stores the Bluetooth pairing information of (LTV1-LR1).

As assumed above, there are three remote control devices SR1, SR2, LR1 having different pairing information, and no remote control device is Bluetooth connected.

If the user uses SR1, all the identification information is the same, a connection UI (FIG. 6B) corresponding to the operation S457 can be displayed.

If the user uses SR2, the identification information (MAC address) of the TV side does not match, the first pairing UI (FIG. 9B) corresponding to operation S446 can be displayed.

When a user uses LR1, the manufacturer identification information (IR signal) does not match, the compatibility UI (FIG. 7B) corresponding to operation S426 may be displayed.

Figure 13:
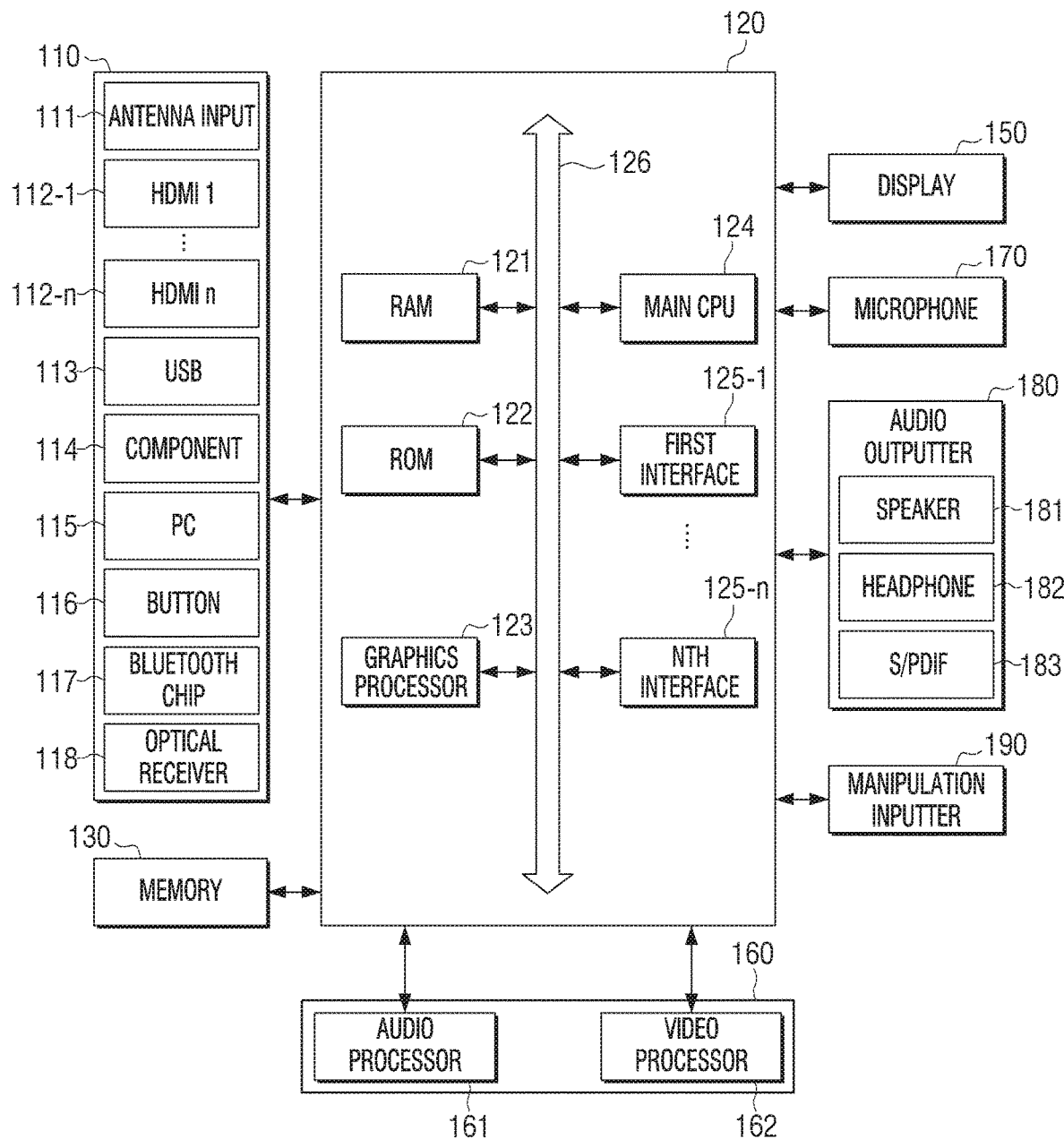
FIG. 13 is a block diagram illustrating an entire configuration of the electronic device of FIG. 1.

FIG. 13 is a block diagram illustrating an entire configuration of the electronic device of FIG. 1.

Referring to FIG. 13, the electronic device 100 may further include an optical receiver 118, a display 150, a signal processor 160, an audio outputter 180, in addition to the communication unit 110, the memory 130, and the processor 120.

The communication unit 110 may include an antenna input port 111, a high-definition multimedia interface (HDMI) input ports 1-n (112-1~112-n), a universal serial bus (USB) port 113, a component input jack 114, a personal computer (PC) input port 115, a button 116, a Bluetooth chip 117, an optical receiver 118, or the like.

The communication unit 110 may include a communication chip such as the Bluetooth chip 117. Although not shown, various communication chips may be included, such as a Wi-Fi chip, an NFC chip, a wireless communication chip, or the like. In the case of using the Bluetooth chip 117, various kinds of connection information such as a SID and a session key are transmitted and received first, and then various information can be transmitted and received after the communication is connected using the same.

The communication unit 110 may include a first communication unit 110-1 and a second communication unit 110-2 as illustrated in FIG. 1.

The electronic device 100 may include a tuner (not shown) to tune a broadcast channel received through the antenna input port 111.

The processor 120 controls overall operations of the electronic device 100 using various programs stored in the memory 130.

The processor 120 includes a random access memory (RAM) 121, a read-only memory (ROM) 122, a graphics processor 120, a main central processing unit (CPU) 124, a first to $n^{th}$ interfaces 125-1~125-n, and a bus 126. The RAM 121, the ROM 122, the graphics processor 123, the main CPU 124, the first to $n^{th}$ interfaces 125-1 to 125-n, or the like, may be interconnected through the bus 126.

The processor 120 may analyze a waveform of an infrared (IR) signal received by IR sniffing and specify an IR signal. By analyzing the image received through the communication unit 110, a control command corresponding to the IR signal can be determined by detecting an image change corresponding to the IR signal, and grasping a type of the detected image change. The device information corresponding to the determined control command and the IR signal can be obtained as device information of an image providing device.

The optical receiver 118 receives an optical signal, such as the IR signal, through an optical window (not shown). The IR signal received through the optical receiver 118 may be a signal for controlling the electronic device 100, or may be a signal receiving a signal to control another device by IR sniffing.

The optical receiver 118 may correspond to the first communication unit 110 of FIG. 1.

The display 150 is configured to display various screens according to a control of the processor 120.

The display 150 may be implemented as a, for example, liquid crystal display (LCD), and may be implemented as a cathode-ray tube (CRT), a plasma display panel (PDP), organic light emitting diodes (OLED), transparent OLED (TOLED), or the like. The display 150 may be implemented as a touch screen capable of detecting a user's touch manipulation.

In this case, the display 150 may be a component included in the electronic device 100.

The electronic device 100 according to still another embodiment may not include a display and may be connected to a separate display device. In this case, the processor 120 may control the communication unit 110 to transmit video and audio signals to a separate display device.

In the meantime, the electronic device 100 according to still another embodiment may not include the display 150 and may be connected to a separate display device. In this case, the display device may be connected to the electronic device 100 for receiving video and audio signals. The display device may include the display and the audio outputter to receive and output the video and audio signals. The audio outputter may include a speaker, a headphone output terminal, or Sony/Philips Digital Interconnect Format (S/PDIF) output terminal to output audio data.

In this case, the electronic device 100 may include an output port for transmitting the video and audio signals to the display device. Here, the output port of the electronic device 100 may be a port for simultaneously transmitting the video and audio signals at the same time. For example, the output port may be one interface among HDMI, display port (DP), and Thunderbolt.

In the meantime, the output port of the electronic device 100 may be configured as separate ports for transmitting video and audio signals, respectively.

A microphone 170 is configured to receive a speech input. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The audio outputter 180 may include a speaker 181 for outputting audio data processed by the audio processor 161, a headphone output terminal 182 or the S/PDIF output terminal 183.

A manipulation inputter 190 may be implemented as a device such as a button, a touch pad, a mouse, and a keyboard, or a touch screen capable of performing a display function and a manipulation input function.

Figure 14:
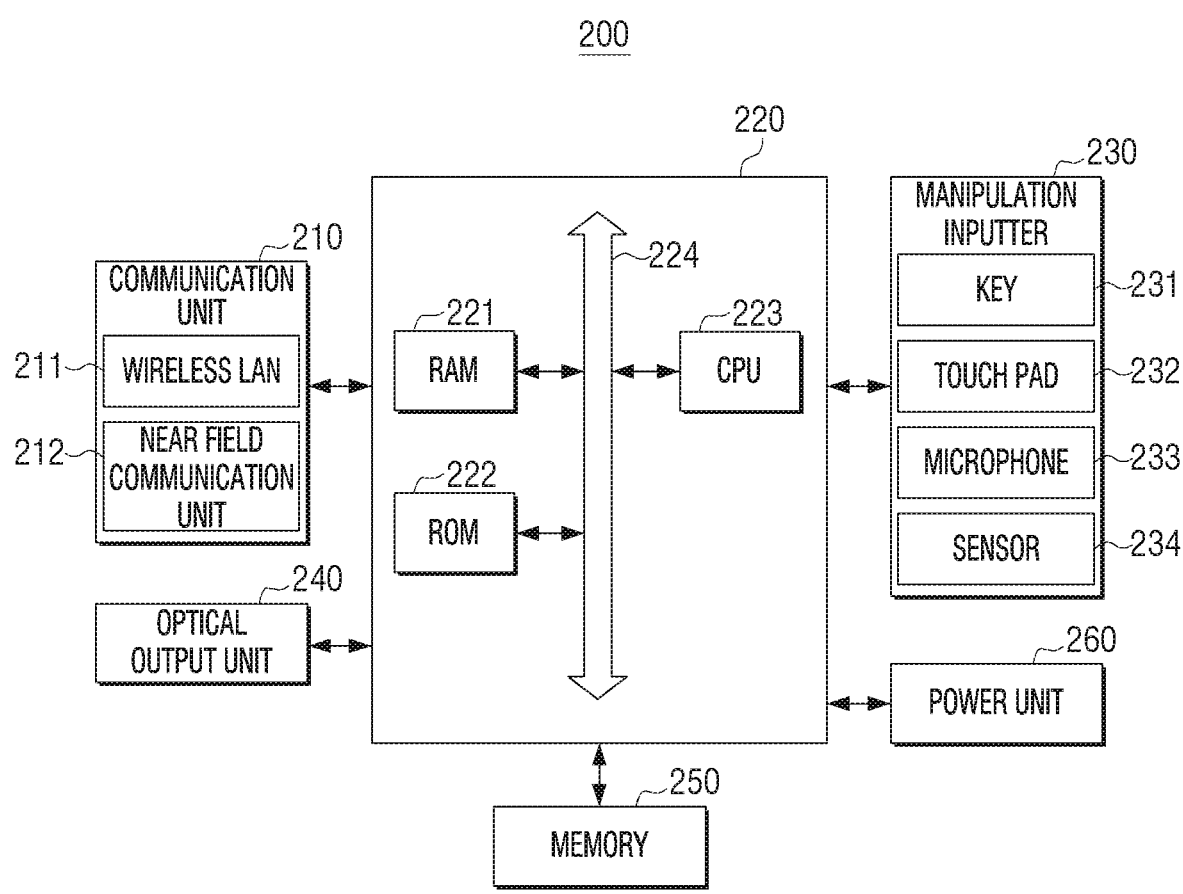
FIG. 14 is a block diagram illustrating a specific configuration of the remote control device of FIG. 2.

FIG. 14 is a block diagram illustrating a specific configuration of the remote control device of FIG. 2.

Referring to FIG. 14, the remote control device 200 controlling the electronic device 100 may include a communication unit 210, a manipulation inputter 230, a processor 220, an optical output unit 240, a memory 250, and a power unit 260.

The communication unit 210 may transmit a signal requesting a wake-up or to transmit a signal for establishing a wireless connection using a two-way communication scheme. Specifically, the communication unit 210 may transmit a signal requesting a response signal to the electronic device, and may receive a response signal of the electronic device. Thereafter, the communication unit 210 can transmit a signal for transmitting various control commands to the electronic device.

The communication unit 210 may include an IR transmitter and transmit a signal requesting a wake-up using a one-way communication scheme.

The communication unit 210 may include at least one of a wireless LAN unit 211 and a near field communication unit 212. For example, one of the wireless LAN unit 211 and the near field communication unit 212, or both of the wireless LAN unit 211 and the near field communication unit 212 can be included.

The communication unit 210 may include both the first communication unit 210-1 and the second communication unit 210-2 as illustrated in FIG. 2.

The communication unit 210 is configured to perform communication with various external devices and may be connected to an external device through a wireless communication. The communication unit 210 may be connected to an external device through a local area network (LAN) or Internet network and through a wireless communication (for example, Z-wave, internet protocol version 4 (IPv4) over low-power wireless personal area networks (4LoWPAN), radio frequency identification (RFID), long-term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless local area network (WLAN), Bluetooth, WiFi, Wi-Fi Direct, global system for mobile communications (GSM), universal mobile telecommunications system (UMTS), long-term evolution (LTE), wireless broadband (WiBRO)). The communication unit 210 may include various communication chips such as a Wi-Fi chip, a Bluetooth chip, an NFC chip, and a wireless communication chip. The Wi-Fi chip, a Bluetooth chip, and an NFC chip may perform communication through the Wi-Fi method, Bluetooth method, and NFC method.

The manipulation inputter 230 may include a key 231, a touch pad 232, a microphone 233, and a sensor 234.

The optical output unit 240 may output an optical signal (e.g., including a control signal) corresponding to the received user input (e.g., touch, press, touch gesture, voice, or motion) as the optical receiver of the electronic device 200 according to the control of the control unit. The remote control code format used in the remote control device 200 may use one of a remote control code format dedicated to a manufacturer and a commercial remote control code format. The remote control code format may include a leader code and a data word. The output optical signal may be modulated and output to a carrier wave. The control signal may be stored in the memory 250 or generated by a control unit. The remote control device 200 may include an infrared-laser emitting diode (IR-LED).

The memory 250 may store various data, programs, or applications for driving and controlling the remote control device 200 under the control of the control unit. The memory 250 may store input or output signals or data corresponding to the operation of the communication unit 210, the optical output unit 240, and the power unit 260. The memory 250 may store a control signal corresponding to the received user input (e.g., touch, press, touch gesture, voice, or motion) according to the control of the control unit.

The memory 250 may be implemented as a non-volatile memory, a volatile memory, a flash memory, a hard disk drive (HDD), or a solid state drive (SSD). The memory 250 may be implemented as a storage medium in the electronic device 100, as well as an external storage medium, for example, a micro secure digital (SD) card, a USB memory, a web server through a network, or the like.

At least one component in response to the performance of the remote control device 200 can be added to or removed from the components shown in the remote control device 200 of FIG. 14. Further, it will be readily understood by those of ordinary skill in the art that the location of the components may be varied in response to the performance or structure of the remote control device 200.

Figure 15:
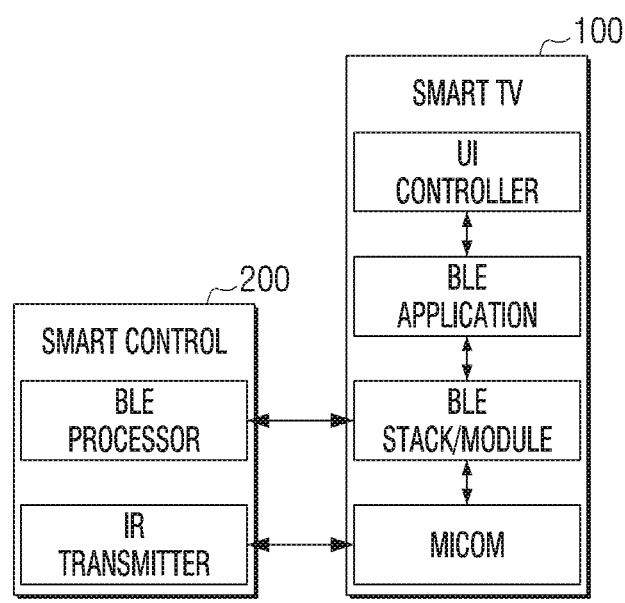
FIG. 15 is a diagram illustrating a relationship between a configuration of the electronic device and a configuration of the remote control device.

FIG. 15 is a diagram illustrating a relationship between a configuration of the electronic device and a configuration of the remote control device.

The remote control device 200 may be composed of a Bluetooth low energy (BLE) processor and an IR receiver.

The BLE processor can identify a Bluetooth pairing and connection state with a TV (electronic device, external device, target device), and can determine whether an IR signal is transmitted or an undirected advertising packet is transmitted. In order to transmit the IR signal, the IR signal output command signal may be delivered to the IR signal output receiver, and the undirected advertising packet can be transmitted.

The IR transmitter may analyze the IR output command signal received from the BLE processor and transmit the IR signal.

The electronic device 100 may be composed of Micom, BLE application, BLE stack/module and UI controller.

The Micom may analyze the IR signal received from the remote control device 200 and determine whether to transmit the BLE application.

The BLE application can determine whether the BLE scan operation is performed by analyzing the IR value received from the Micom. In addition, the BLE application can analyze the undirected advertising packet received from the BLE stack to determine whether the re-pairing guide UI is required, and transmit a pop-up UI output signal to the UI control unit.

The BLE stack/module may receive the BLE scan command from the BLE application and perform a BLE scan operation. In addition, it is possible to transmit the undirected advertising packet received from the remote control device 200 to the BLE application.

The UI control unit may control to analyze the pop-up UI output signal received from the BLE application and display the guide UI.

Figure 16:
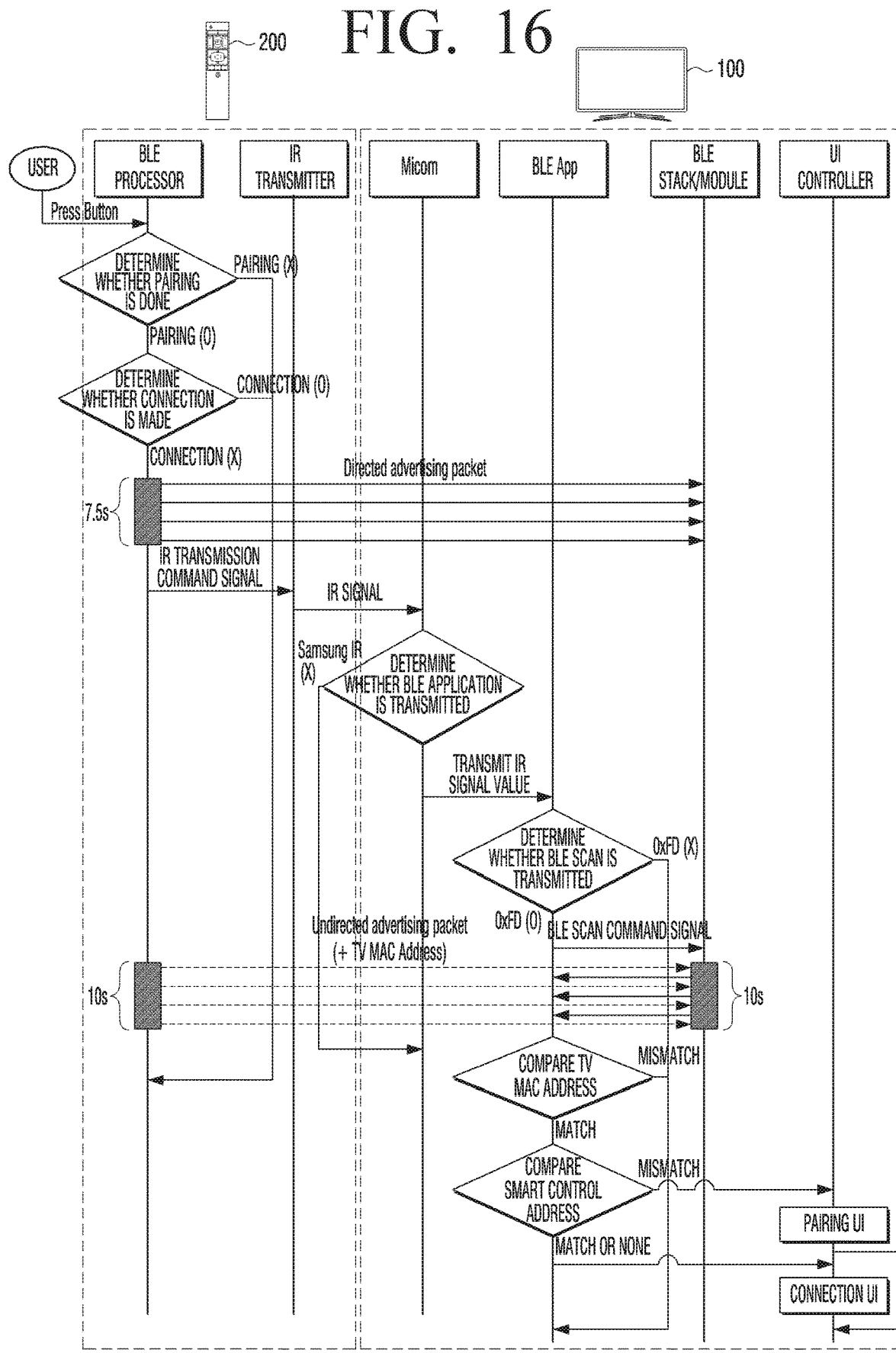
FIG. 16 is a diagram illustrating a method of providing UI for guiding the Bluetooth connection between the remote control device and the electronic device by specifying a configuration of each device according to an embodiment.

FIG. 16 is a diagram illustrating a method of providing UI for guiding the Bluetooth connection between the remote control device and the electronic device by specifying a configuration of each device according to an embodiment.

The user can perform Bluetooth communication when pressing a button of the remote control device 200. However, if the Bluetooth connection is not properly established, the electronic device 100 cannot be controlled through the remote control device 200.

Accordingly, if the Bluetooth connection is not properly established, the Bluetooth connection may be tried by transmitting a specific signal to the remote control device 200.

Specifically, the BLE processor of the remote control device 200 may identify whether the electronic device 100 is paired. If the BLE processor of the remote control device 200 is paired with the electronic device 100, Bluetooth connection with the electronic device 100 can be determined.

The BLE processor of the remote control device 200 may transmit a directed advertising packet for 7.5 seconds if it is determined that Bluetooth connection with the electronic device 100 is not made. Here, 7.5 seconds can be changed by a user's setting.

The BLE processor of the remote control device 200 may transmit the IR transmit command signal to the IR transmitter after 7.5 seconds. The IR transmitter of the remote control apparatus 200 may transmit the IR signal after receiving the IR transmission command signal.

The BLE processor of the remote control device 200 may transmit the undirected advertising packet for ten seconds. Ten seconds can be set by a user's setting.

The Micom of the electronic device 100 can receive the IR signal from the IR transmitter of the remote control device 200 and determine whether to deliver a signal value to the BLE application (BLE APP). The Micom of the electronic device 100 can transmit the IR signal value to the BLE APP when the IR signal uses a preset IR format (Samsung IR format).

The BLE APP of the electronic device 100 may receive the IR signal value received from the Micom and determine whether the BLE is scanned. Here, the BLE scan can mean scanning of the undirected advertising packet transmitted by the remote control device 200.

The BLE APP of the electronic device 100 can transmit the BLE scan command signal to the BLE stack/module when the IR signal value is a preset signal value (0xFD). Here, the preset signal value (0xFD) may be changed by the user.

The BLE stack/module of the electronic device 100 may receive a BLE scan command signal and may perform BLE scan for ten seconds. Here, ten seconds can be changed by the user's setting.

The BLE stack/module of the electronic device 100 may receive the undirected advertising packet from the BLE processor of the remote control device and transmit the packet to the BLE APP.

The BLE APP of the electronic device 100 can receive an undirected advertising packet from the BLE stack/module and compare the identification information (MAC address) stored in the memory of the electronic device 100 with the identification information of a target device (external device) included in the undirected advertising packet.

When the identification information (MAC address) stored in the memory of the electronic device 100 and the identification information of a target device (external device) included in an undirected advertising packet match, the electronic device 100 can compare identification information (MAC address) of the remote control device stored in the memory and identification information (MAC address) of the remote control device 200 included in the undirected advertising packet.

The BLE APP of the electronic device 100 may provide a pairing UI when the identification information (MAC address) of the remote control device stored in the memory of the electronic device 100 and the identification information (MAC address) of the remote control device 200 included in the undirected advertising packet do not match.

The BLE APP of the electronic device 100 can provide the connection UI when the identification information (MAC address) of the remote control device which is stored in the memory by the electronic device 100 matches the identification information (MAC address) of the remote control device 200 included in the undirected advertising packet.

The BLE APP of the electronic device 100 may provide a connection UI when there is no address of the remote control device stored in the memory by the electronic device 100.

The electronic device 100 may implement a Bluetooth communication module and a module performing a general control operation separately. For example, in a Bluetooth communication module, an operation of determining whether or not a signal value is transferred to the BLE APP, an operation of determining whether a BLE scan is performed, and an operation of comparing MAC address can all be performed. A general processor may perform an operation of displaying a UI.

Figure 17:
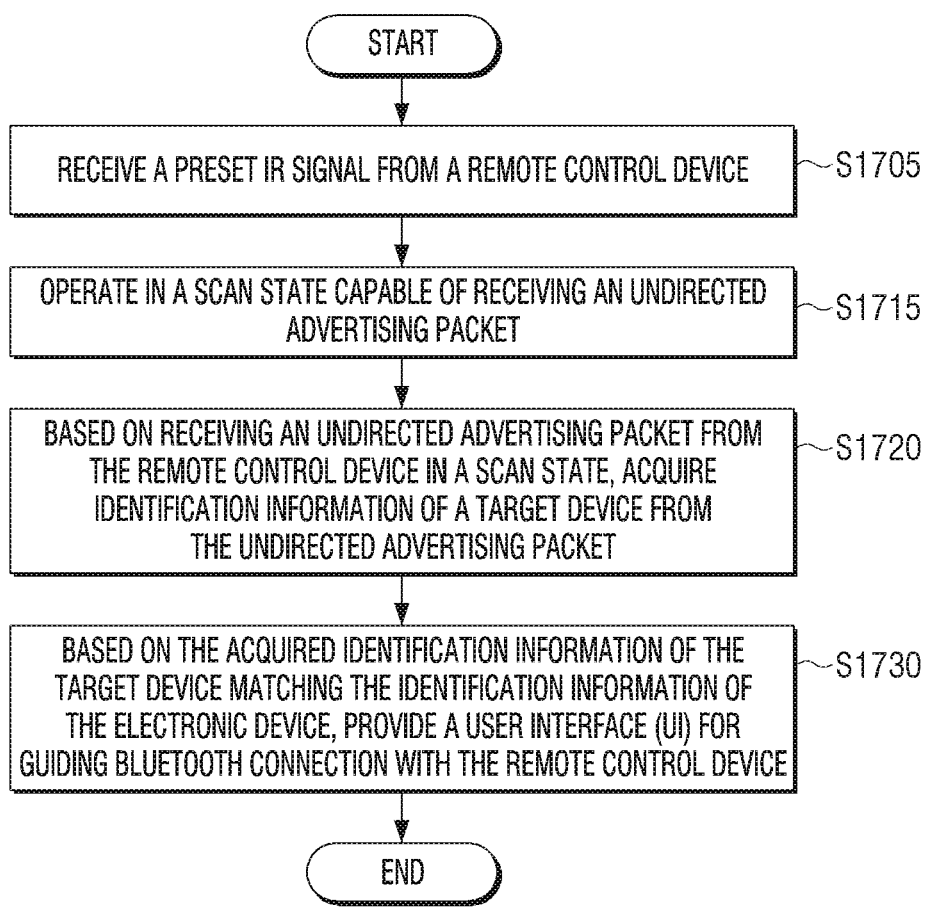
FIG. 17 is a diagram illustrating a method for controlling an electronic device according to an embodiment.

FIG. 17 is a diagram illustrating a method for controlling an electronic device according to an embodiment.

A controlling method of the electronic device 100 according to one embodiment may receive a preset IR from the remote control device in operation S1705. In addition, when the electronic device 100 receives a preset IR signal, the electronic device 100 controls to operate in a scan state capable of receiving an undirected advertising packet in operation S1715.

In addition, when an undirected advertising packet is received from the remote control device 200 in the scan state, the electronic device 100 may obtain the identification information of the target device from the undirected advertising packet in operation S1720.

If the identification information of the obtained target device is identified as matching the identification information of the electronic device 100, the electronic device 100 may provide a user experience interface (UI) for guiding a Bluetooth connection with the remote control device 200 in operation S1730.

In operation of S1730, if the obtained identification information of the target device matches the identification information of the electronic device 100, it may be identified that the identification information of the remote control device 200 included in the undirected advertising packet matches the identification information included in the Bluetooth pairing history and may provide the UI based on the identification.

In operation S1730, if the identification information of the remote control device 200 matches the identification information included in the Bluetooth pairing history, a UI for guising a user's manipulation to perform reconnection with the remote control device 200 can be provided.

In operation S1730, if the identification information of the remote control device 200 does not match the identification information included in the Bluetooth pairing history, a UI for guiding a user's manipulation to perform pairing with the remote control device 200 can be provided.

The identification information of the target device may be stored in a field assigned to record custom data in the undirected advertising packet.

The preset IR signal may be a signal to control the electronic device 100 to operate in a scan state.

In operation S1715, when the first information included in the received IR signal matches the preset first information, the electronic device 100 can be controlled to identify whether preset second information is included in the IR signal, and when the second information is included in the IR signal, the electronic device 100 may be controller to operate in a scan state capable of receiving the undirected advertising packet.

The preset first information may be manufacturer information, and the preset second information may be information that controls the second communication unit 110-2 to operate in a scan state.

The method for controlling the electronic device as illustrated in FIG. 17 can be performed on an electronic device having the configuration of FIG. 1, 13, or 15, and can be executed on an electronic device having other configurations.

The method for controlling the electronic device according to the embodiment described above can be implemented with a program and provided to the electronic device. In particular, a program comprising the method for controlling the electronic device can be stored in a non-transitory computer readable medium and provided.

Meanwhile, the methods according to various embodiments of the disclosure described above can be implemented in an application form capable of being installed in an existing electronic device.

The methods according to various embodiments may be implemented by software upgrade of a related art electronic device, or hardware upgrade only.

The various embodiments described above may be implemented through an embedded server provided in the electronic device or a server outside the electronic device.

The method for controlling the electronic device according to the embodiment described above can be implemented with a program and provided to the electronic device. In particular, a program comprising the method for controlling the electronic device can be stored in a non-transitory computer readable medium and provided.

The various example embodiments described above may be implemented in a recordable medium which is readable by computer or a device similar to computer using software, hardware, or the combination of software and hardware. By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations of the electronic device according to the various embodiments described above may be stored in a non-transitory computer-readable medium. The computer instructions stored in this non-transitory computer-readable medium may cause the above-described specific device to perform the processing operations in the electronic device according to the above-described various example embodiments when executed by the processor of the device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing example embodiments and advantages are merely examples and are not to be understood as limiting the disclosure. The present disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. An electronic device comprising:
    a first communication unit including a communication circuit;
    a second communication unit including a communication circuit; and
    at least one processor configured to:
        based on a preset infra-red (IR) signal being received from a remote control device through the first communication unit, control the second communication unit to operate in a scan state in which an advertising packet is receivable,
        based on the advertising packet being received from the remote control device in the scan state, acquire identification information of the remote control device from the advertising packet, and
        based on the acquired identification information of the remote control device not matching identification information of a remote control device stored in the electronic device, provide a user interface (UI) for guiding Bluetooth communication with the remote control device.

2. The electronic device of claim 1, wherein the UI for guiding the Bluetooth communication comprises a UI for guiding Bluetooth pairing with the remote control device.

3. The electronic device of claim 1, wherein the UI includes information for indicating the acquired identification information of the remote control device is not matching the identification information of the remote control device stored in the electronic device.

4. The electronic device of claim 1, wherein the UI includes information for guiding a user's manipulation to perform the Bluetooth communication with the remote control device.

5. The electronic device of claim 1, wherein the UI includes information for guiding a user's manipulation to press a pre-determined button corresponding to the Bluetooth communication.

6. The electronic device of claim 5, wherein at least one processor is configured to:
    based on the pre-determined button being pressed by a user's manipulation, perform an operation for the Bluetooth communication with the remote control device.

7. The electronic device of claim 1, wherein at least one processor is configured to:
    acquire identification information of a target device and identification information of the remote control device from the acquired identification information, and
    based on the acquired identification information of the target device matching the identification information of the remote control device stored in the electronic device, identify whether the acquired identification information of the remote control device matches identification information included in a Bluetooth pairing history, and provide the UI based on the identification.

8. The electronic device of claim 7, wherein at least one processor is configured to:
    based on the identification information of the remote control device matching the identification information included in the Bluetooth pairing history, provide a UI for guiding Bluetooth connection with the remote control device.

9. The electronic device of claim 7, wherein at least one processor is configured to:
    based on the identification information of the remote control device not matching the identification information included in the Bluetooth pairing history, provide a UI for guiding Bluetooth pairing with the remote control device.

10. The electronic device of claim 1, wherein at least one processor is configured to:
    based on first information included in the received IR signal matching preset first information, identify whether preset second information is included in the IR signal, and
    based on the second information being included in the IR signal, control the second communication unit to operate in the scan state, and
    wherein the preset first information includes manufacturer information, and the preset second information includes information to control the second communication unit to operate in the scan state.

11. A method for controlling an electronic device, the method comprising:
    based on a preset infra-red (IR) signal being received from a remote control device, controlling the electronic device to operate in a scan state in which an advertising packet is receivable;
    based on the advertising packet being received from the remote control device in the scan state, acquiring identification information of the remote control device from the advertising packet; and
    based on the acquired identification information of the remote control device not matching identification information of a remote control device stored in the electronic device, providing a user interface (UI) for guiding Bluetooth communication with the remote control device.

12. The method of claim 11, wherein the UI for guiding the Bluetooth communication comprises a UI for guiding Bluetooth pairing with the remote control device.

13. The method of claim 11, wherein the UI includes information for indicating the acquired identification information of the remote control device is not matching the identification information of the remote control device stored in the electronic device.

14. The method of claim 11, wherein the UI includes information for guiding a user's manipulation to perform the Bluetooth communication with the remote control device.

15. The method of claim 11, wherein the UI includes information for guiding a user's manipulation to press a pre-determined button corresponding to the Bluetooth communication.

16. The method of claim 15, wherein the method further comprises:
  based on the pre-determined button being pressed by a user's manipulation, performing an operation for the Bluetooth communication with the remote control device.

17. The method of claim 11, wherein the method further comprises:
  acquiring identification information of a target device and identification information of the remote control device from the acquired identification information; and
  based on the acquired identification information of the target device matching the identification information of the remote control device stored in the electronic device, identifying whether the acquired identification information of the remote control device matches identification information included in a Bluetooth pairing history, and providing the UI based on the identification.

18. The method of claim 17, wherein the method further comprises:
  based on the identification information of the remote control device matching the identification information included in the Bluetooth pairing history, providing the UI for guiding Bluetooth connection with the remote control device.

19. The method of claim 17, wherein the method further comprises:
  based on the identification information of the remote control device not matching the identification information included in the Bluetooth pairing history, providing the UI for guiding Bluetooth pairing with the remote control device.

20. The method of claim 11, wherein the method further comprises:
  based on first information included in the received IR signal matching preset first information, identifying whether preset second information is included in the IR signal; and
  based on the second information being included in the IR signal, controlling the electronic device to operate in the scan state; and
  wherein the preset first information is manufacturer information, and the preset second information is information to control the electronic device to operate in the scan state.

* * * * *